(12) United States Patent  
Margulis

(10) Patent No.: US 8,698,701 B2
(45) Date of Patent: *Apr. 15, 2014

(54) FIELD SEQUENTIAL LIGHT SOURCE MODULATION FOR A DIGITAL DISPLAY SYSTEM

(75) Inventor: Neal D. Margulis, San Francisco, CA (US)

(73) Assignee: Digital Display Innovations, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/600,165

(22) Filed: Aug. 30, 2012

(65) Prior Publication Data

US 2012/0327139 A1 Dec. 27, 2012

Related U.S. Application Data

(63) Continuation of application No. 12/027,923, filed on Feb. 7, 2008, now Pat. No. 8,279,138, which is a continuation of application No. 11/294,173, filed on Dec. 5, 2005, now Pat. No. 7,364,306, which is a continuation-in-part of application No. 11/255,353, filed on Oct. 21, 2005, now Pat. No. 7,404,645, which is a continuation-in-part of application No. 11/158,476, filed on Jun. 20, 2005, now abandoned.

(51) Int. Cl.
*G09G 5/00* (2006.01)

(52) U.S. Cl.
USPC .......................................................... 345/1.1

(58) Field of Classification Search
USPC .................. 345/1.1, 501, 506; 348/625, 745; 353/31, 122

See application file for complete search history.

(56) References Cited

U.S. PATENT DOCUMENTS

| | | | | | |
|---|---|---|---|---|---|
| 5,619,256 | A | * | 4/1997 | Haskell et al. | 348/43 |
| 5,734,771 | A | * | 3/1998 | Huang | 385/93 |
| 6,157,396 | A | * | 12/2000 | Margulis et al. | 345/506 |
| 2002/0057253 | A1 | * | 5/2002 | Lim et al. | 345/102 |
| 2004/0207821 | A1 | * | 10/2004 | Roddy et al. | 353/94 |
| 2005/0088622 | A1 | * | 4/2005 | De Vaan et al. | 353/31 |
| 2005/0248737 | A1 | * | 11/2005 | Engle | 353/122 |
| 2006/0044243 | A1 | * | 3/2006 | Rysinski | 345/92 |

* cited by examiner

*Primary Examiner* — William Boddie
*Assistant Examiner* — Carolyn R Edwards
(74) *Attorney, Agent, or Firm* — Eppa Hite

(57) ABSTRACT

A digital display system consists of an image modulator and multiple light modulators. An image processing system processes an incoming data stream, scans processed data to an image modulator and controls for the light modulators. Other user inputs and sensors are used to affect the processing and controls. The timing for scanning the processed data into the image modulators is controlled along with the intensity and wavelength of the light modulators. The display system may implement a spatial and temporal image processing, digital shutter controls, rolling shutter controls, sequential color output, adaptive dynamic sensor feedback, frame rate matching, motion compensated field sequencing and a variety of other techniques to produce a high quality display output. The resulting display has improved image consistency, enhanced color gamut, higher dynamic range and is better able to portray high motion content.

5 Claims, 8 Drawing Sheets

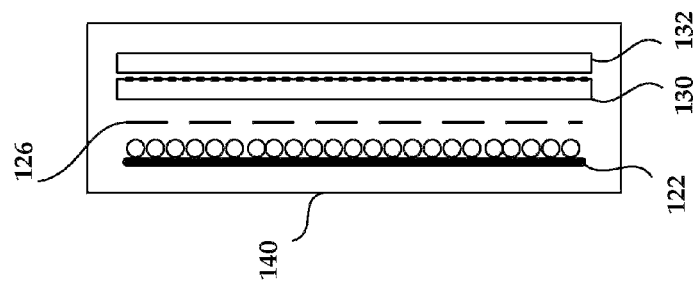
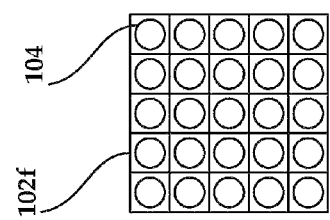
FIG. 1A
PRIOR ART
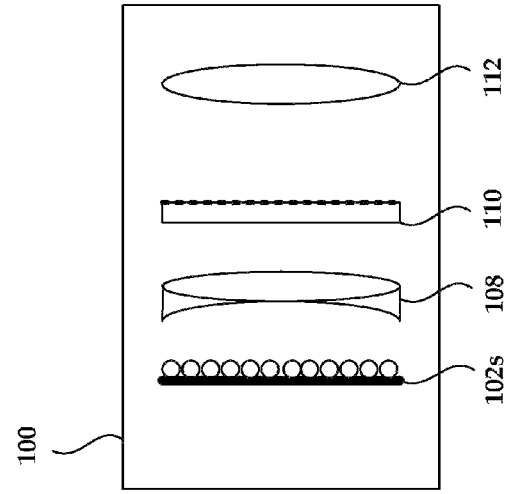
FIG. 1B
PRIOR ART
FIG. 1C
PRIOR ART

FIELD SEQUENTIAL LIGHT SOURCE MODULATION FOR A DIGITAL DISPLAY SYSTEM

This application is a Continuation of U.S. application Ser. No. 12/027,923 filed Feb. 7, 2008, now U.S. Pat. No. 8,279,138, which is a Continuation of U.S. application Ser. No. 11/294,173 filed Dec. 5, 2005, now U.S. Pat. No. 7,364,306, which is a Continuation-in-Part of U.S. application Ser. No. 11/255,353 filed Oct. 21, 2005, now U.S. Pat. No. 7,404,645, which is a Continuation-in-Part of U.S. application Ser. No. 11/158,476 filed Jun. 20, 2005, now abandoned; all of which are hereby incorporated by reference in their entirety.

BACKGROUND OF THE INVENTION

1. Field of the Invention

The present invention relates generally to an image processing and modulation system for a digital display system, and more particularly to performing field sequential lighting control along with advanced image processing and image modulation to produce high-quality output images.

2. Discussion of Prior Art

The many types of Flat Panel Display (FPD) technologies include Active Matrix Liquid Crystal Displays (AMLCDs) also referred to as Thin Film Transistor displays (TFTs), silicon Reflective LCDs (si-RLCDs), Liquid Crystal On Silicon (LCOS), ferroelectric displays (FLCs), Field Emission Displays (FEDs), Carbon Nanotube based Nano Emissive Displays (NEDs), ElectroLuminescent Displays (ELDs), Light Emitting Diodes (LEDs), Organic LEDs (OLEDs), Plasma Displays (PDs), Passive matrix Liquid Crystal Displays (LCDs), Thin Film Transistor (TFT), Silicon X-tal Reflective Displays (SXRD) and Digital Mirror Displays (DMDs).

Manufacturing FPDs requires special processing steps and it is often difficult to achieve acceptable visual quality in terms of consistence across the entire area of the display. Besides being a yield issue for new displays, display characteristics can change over operating conditions and over the lifetime of the display. Most FPD technologies also require light sources, such as fluorescent lamps, Cold Cathode Florescent lamps, Ultra High Power (UHP) lamps or Light Emitting Diodes (LEDs) to illuminate the display images. LEDs may be made from a variety of materials and each may have their own "color temperature" characteristics. Other systems may use a hybrid of a traditional lamp along with one or more white or colored LED arrays. In one example system, Sharp Corporation of Japan uses a cold cathode florescent lamp along with red LEDs in a hybrid back light approach for 37" and 57" LCD TVs.

Some of these technologies can be viewed directly as FPDs and others are used as microdisplay devices where the image is projected and a user views the projected image.

Projection display systems may use transmissive or reflective "microdisplay" technologies. To achieve the desired full color gamut in microdisplay based parallel color projection systems, three separate microdisplay image modulators, one for each of the R, G, and B (RGB) components, may be used. A single microdisplay image modulator which produces R, G, and B, either through spatial color filters or with sequential color fields at a sufficiently high rate can cost less. Other light sources such as LEDs and lasers may also be used for the different colors with one, three or more imagers. Reflective technologies such as Texas Instruments Digital Light Processing (TI DLP) and technologies such as LCOS imagers are other examples of popular microdisplay technologies. Sony uses a Silicon X-tal Reflective Display (SXRD) microdisplay in some of their rear projection television systems. Other display devices may be based on High Temperature Poly-Silicon (HTPS) technology, Micro Electro-Mechanical Systems (MEMS) or Carbon Nanotubes.

Projection displays have a projection path with associated additional properties. For example, projecting an image from a projector on a level below the middle of a flat screen results in an image which is narrower at the bottom than at the top in what is known as the "Keystone" effect. Radial distortion occurs when an image pixel is displaced from its ideal position along a radial axis of the image. Because an image has the largest field angles in the display corners, the corners exhibit worse radial distortion than other display areas. Radial distortion includes barrel distortion, where image magnification decreases towards the corners, and pin cushion distortion, where the magnification increases towards the corners. Lens related distortions including radial distortion can cause image deformation. Distortion can also result from non-flat screens or the Earth's magnetic field. Shortening the projection path, often done to thin a rear projection system, also increases distortion. The non-uniform projection characteristics of a display system may be represented by a "distortion map" which is based on a single pixel or a group of pixels.

Types of three dimensional binocular display systems include anaglyph displays, frame sequence displays, autostereoscopic displays, single and multi-turn helix displays. These normally have multiple camera data channels. Anaglyph systems usually require a user to wear red and green (or red and blue or red and cyan) glasses so that each eye perceives a different view. Frame sequencing systems use shutter glasses to separate left and right views. Autostereoscopic displays use lenticular lenses and holographic optical elements. Single or multi-turn helix displays use multiple semi-transparent display screens which can be seen by multiple observers without special glasses.

There is a finite time required to load an image into an array so that the entire frame is available for display. A TFT display typically includes column and row drivers that are used to capture a serial frame data stream and scan the values into the display array. Some displays illuminate the image array during the loading process and other displays wait until the entire image is loaded and "flash" the illumination. Because of inherent response characteristics of LCD materials and the control of the illumination, LCD-based projection and LCD-based direct view display systems each have unique flicker characteristics and exhibit different motion artifacts. Further, LCDs switch in the finite time it takes to change the state of a pixel. Active matrix thin film transistor (TFT) displays, which have an active transistor controlling each display pixel, require a switching time related to the LCD material composition and thickness, and to the techniques of switching. The transitions from one state to another are also not necessarily linear and can vary depending on the sequence of pixel values.

The ability to accurately portray each color component for each pixel at each screen location is another desired function of a high quality display device. Since a display output pixel typically consists of a triad (red, green, blue) or other combination of color components, each color component for each pixel is typically made up of multiple sub-pixels. However, the term "pixel" is also used to describe the triad of sub-pixels. Each color component of the pixels mapped to the screen display pixels may transfer non-uniformly where some pixels end up too bright and others end up not bright enough. This non-uniformity may be a function of the light path characteristics, the mirrors, the lenses, the lamps or any combination thereof. Similarly for LED backlit FPDs, the spacing and positioning of the LEDs may cause non-uniform brightness patterns where the image modulator pixels closer to the LEDs appear brighter than the image modulator pixels further from the LEDs. In the case of colored LEDs or LEDs with color filters, the modulator pixels may be further affected not just with brightness differences, but with color uniformity differences. The brightness of LEDs can be modulated using various Pulse Width Modulation (PWM) techniques or varied by adjusting the voltage or current. The LEDs may be controlled collectively, by proximity in groups, by color, by some combination or in the most sophisticated case each LED can be controlled individually.

FIG. 1A shows a front view of an LED array 102f made up of a structure of multiple LEDs 104. Each LED is a light source which can be either a white LED or one of a variety of colors such as red, green or blue. Other LED colors are also used and the color may be part of the LED structure, may be a color filter as part of each LED or may be a filter mechanism for the array of LEDs. The array of LEDs may be arranged in a pattern of colors so as to produce a controllable and consistent light source that, when combined with an image modulator, is capable of producing the full gamut of display colors.

FIG. 1B shows a side view of a light source subsystem 100 used in a projection system. Subsystem 100 includes an LED array 102s structured from multiple LEDs 104, a multi-lens system 108 and 112 and a microdisplay imager or image modulator 110 that may use a variety of light modulation techniques. The LEDs may be white or multicolored and an additional color system (not shown), such as a color wheel, may also be included in system 100. In one example system, lens 108 concentrates the light through the microdisplay 110, and lens 112 controls the light projection. The projection system may be front or rear projection and use other lenses and mirrors, dichroic recombiners and filters to project the image on a screen (not shown). Microdisplay 110 may be either transmissive, passing modulated amounts of light through each pixel, or reflective, reflecting modulated amounts. The resolution of the microdisplay 110 is typically much higher than the resolution of the components that make up the light source. Projection systems utilizing a color wheel, such as a TI DLP based system, may sequentially project Red, Green and Blue color fields of the image. Other projection systems may use separate image modulators 110 per color component.

FIG. 1C shows a side view of a direct view LCD panel subsystem 140 where a backlight 122 is made up of either strips 122 or an array 102 of LEDs. The LCD display or image modulator 130 typically has a much higher resolution than the resolution of the components that make up the light source. Exceptions include OLEDs, where each LCD pixel has a light source as part of the pixel and as such the resolution of the light sources is the same as that of the display, and NEDs, where carbon nanotubes are arranged such that a properly applied voltage excites each nanotube which in turn bombards the color phosphors for the pixels or subpixels with electrons and "lights them up." The brightness and color wavelength is based on the quantity of electrons, the phosphors used and a variety of other factors.

For LED backlit displays, various filters, color and light diffusion gradients, Brightness Enhancement Films (BEF), diffusion plates, light guides and mixing light guides 126 may be used as an option to improve the light uniformity for the display. Some backlit displays may also include one or more optical sensors (not shown in FIG. 1C) that can detect changes in brightness and wavelength (see Hamamatsu product brief). A typical direct view system includes a color filter 132 that is closely matched to the sub pixels of the image modulator. Depending on the materials and fabrication steps, the color filter may be a pattern of R, G and B stripes or other block arrangements similar to Bayer patterns that are "overlaid" or "printed" onto an image modulator's screen. The image modulator may include three or four times the sub-pixel sites so that there are separate controls for each R, G and B sub-pixel component of each pixel. Since color filters typically operate by filtering out wavelengths from a white light source, some lumen efficiency is lost by using color filters.

Most image modulators (110 and 130) are addressed in raster scan fashion and each pixel is refreshed during each display frame interval. Row and Column drivers are typically used in the scanning process and every output pixel is written to the display during every refresh cycle regardless of whether the value of the pixel has changed since the last cycle. Each R, G, and B color component normally has a different intensity value which is digitally represented by a number of bits. For example, if 8 bits represent each R, G, and B color component, then each component has $2^8$ (=256) intensity values from 0 to 255. Changing the intensity value of a color component in an ideal digital device from a number X, for example, to a number Y, takes just as long regardless of the Y value. So in an ideal system, changing a color component value from 2 to 3 takes as long as changing the value from 2 to 200. However, because of the nature of LCD image modulator pixels, the transitions for modulating light intensities are not purely digital, and are not necessarily linear. U.S. Pat. No. 6,340,994 by Margulis et al. teaches Temporal Gamma Processing (TGP) which assures that the time-related representations of an image are as accurate as possible, based on a previous frame value and a known transfer function of the display modulation system and adjusting its output to a desired value during display of a desired frame.

The light sources for a modulator based system may not be able to achieve the desired brightness or accurately and uniformly reproduce the intended color gamut. Different modulator pixel positions on the screen may be affected by the light sources differently, causing a display of non-uniform color and brightness. Additionally, the light sources' output characteristics may change over time and need to be compensated for.

Therefore, for all the foregoing reasons, what is needed is an image processing system to effectively enhance display quality by controlling both the image modulator and controlling colored light sources and thereby provide better visual images.

SUMMARY OF THE INVENTION

The present invention provides an apparatus and method for performing image processing that controls both the image modulator and the colored light sources to enhance display quality.

The image processing system considers user inputs, system configuration and design information, sensor feedback, pixel modulation information, and lighting control information to characterize the display environment. An incoming data stream is then compensated both spatially and temporally for the various display characteristics.

In addition to producing modified output pixels, the image processing system controls colored light sources of LEDs, or can control a block or module of light sources. The light sources include the lighting elements within the display system and may include lights that affect the ambient lighting around the display as well as around the entire room. Each frame is broken into fields and the fields are sequentially scanned into an image modulator along with careful timing of modulation of the corresponding colored light sources.

An exemplary Flat Panel Display system has a patterned array of red, green and blue LEDs as the back light and an LCD panel as the image modulator. The LEDs are individually controlled and illuminate the LCD panel, which is much higher resolution than the number of LEDs. Depending on its position on the panel, each triplet of LEDs affects a block of LCD image pixels. The Display Output Processing (DOP) for this exemplary system field sequences the image modulator and the colored light sources. The resulting display has improved image consistency, enhanced color gamut, and higher dynamic range, and is better able to portray high motion content.

BRIEF DESCRIPTION OF THE DRAWINGS

FIG. 1A is a block diagram of a prior art LED array of individual LED elements;

FIG. 1B is a block diagram showing a side view of a light source, microdisplay image modulator and lenses of a prior art projection system;

FIG. 1C is a block diagram showing a side view of a light source, a color filter and an image modulator of a prior art flat panel display system;

DETAILED DESCRIPTION OF THE PREFERRED EMBODIMENTS

The present invention provides improvements in electronic image processing technology and an image processing apparatus for use in an image display system. The apparatus includes a display output processing module that controls both a digital image modulator and controls for sequencing one or more color light sources illuminating the image modulator.

Figure 2:
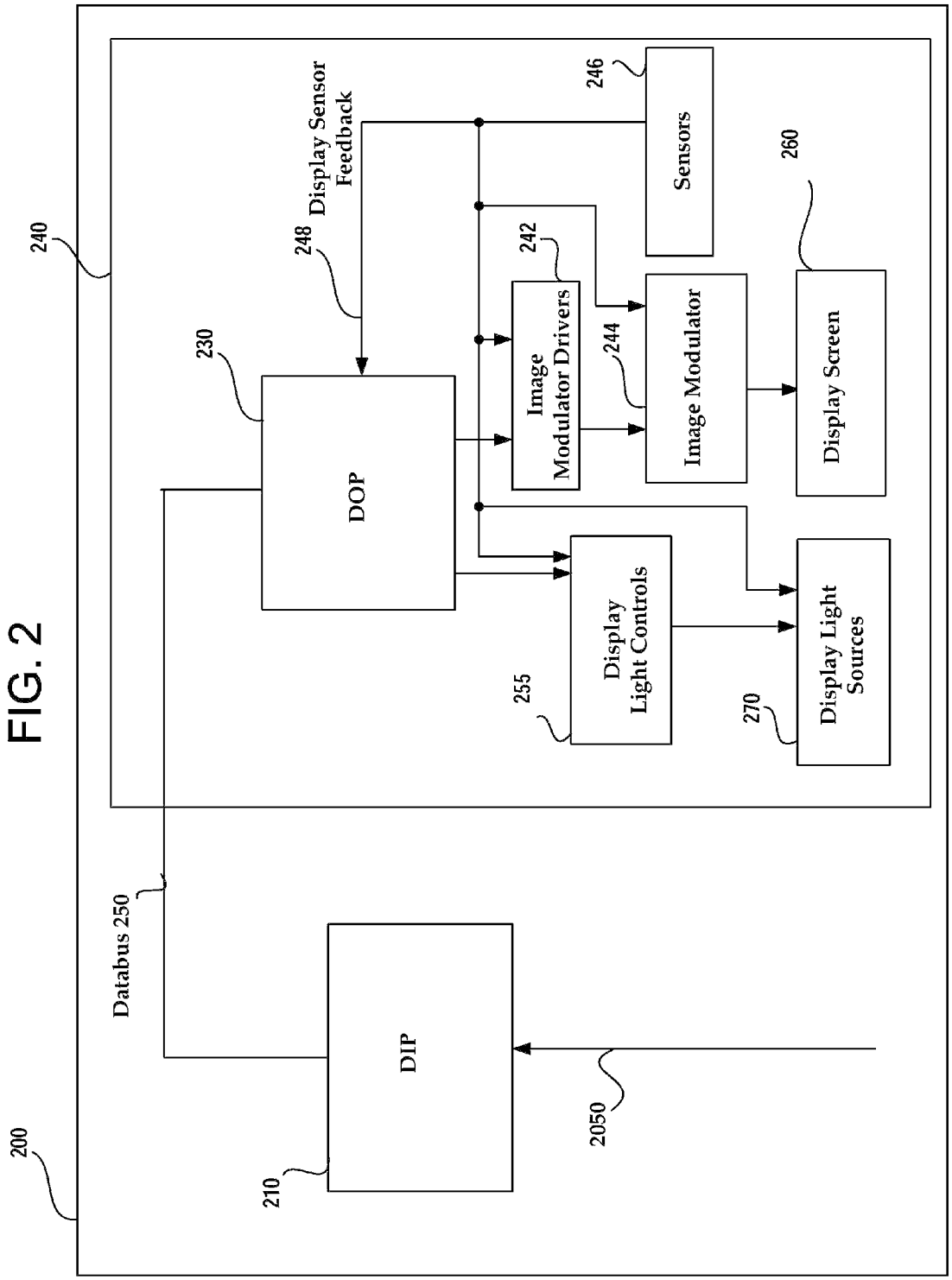
FIG. 2 is a block diagram of one embodiment of the Display Input Processor (DIP) and Display Output Processor (DOP) system in accordance with the invention.

FIG. 2 shows an image processing system 200 which includes a Display Input Processor (DIP) 210 and a Display System 240 including a Display Output Processor (DOP) 230 with a common databus 250 coupling the DIP 210 and the DOP 230. Display System 240 also includes an image modulator 244 (comparable to FIGS. 1B and 1C modulators 110 and 130) coupled to a display screen 260 and via image modulator drivers 242 to DOP 230. DOP 230 produces outputs to Display Light Controls 255 which are coupled to the display light sources 270, and receives display sensor feedback via path 248 from various sensors 246. Display sensor feedback may also be processed by other subsystems including the display light controls 255, modulator drivers 242, display light sources 270 or image modulator 244. Different sensors may provide feedback to different subsystems. Other subsystems, such as display light sources 270, may include local sensors (not shown). DIP 210 preferably receives image data on line 2050 and reconstructs images both spatially and temporally. DIP 210 outputs are processed by DOP 230 to enhance visual quality of images and perform display-specific processing.

Image modulator 244 can be part of an LCD-based direct view system such as a TFT display where the display screen 260 is an integrated part of a flat panel display and the image modulator drivers 242 control the screen pixels. DOP 230 may also include Timing Controls (TCON) for a flat panel display. If image modulator 244 is part of a projection system, then image modulator 244 provides images to be projected and enlarged onto display screen 260. In a projection system, image modulator 244 is more likely a relatively small (inches) microdisplay element and may be either stationary or movable. The image modulator drivers 242 may be relatively simple or, as in the case of a MEMs based modulator, include complex processing specific to the microdisplay.

The choice of the lighting elements for both FPD direct view screens and for microdisplay based projection systems is a key element to achieving high display quality. In addition to providing the overall brightness to the display, a lighting system of controllable light elements according to the invention can be combined with image modulation techniques to achieve improved display results. With advanced image processing and by controlling both the light elements and the image modulator, digital displays with high dynamic range and an expanded color gamut can be developed. The human eye can often perceive high dynamic range more readily than higher resolution alone; thus a higher apparent quality display can result from a higher dynamic range. LCD material is not able to fully block out very high intensity light, making achieving proper black levels another problem that can be relieved with intelligent processing and controls of the light sources.

Projection systems using scanning lasers with the ability to adjust the light intensity at different points along each scan can produce improved dynamic range displays. Even though the scanning laser may not fully vary the light intensity across the full light range for each pixel, the varied light intensities at the lower resolution can be combined with a full resolution microdisplay to produce a high dynamic range projection system. Multi-wavelength scanning lasers can sequence the different color components to temporally combine to produce a full resolution display. Where the resolution to vary the laser intensity is not controllable at the pixel level, the laser can combine with the microdisplay for a high dynamic range projection system and can also be used to enhance the color gamut. Enhancements for motion portrayal can also be included in the controls for a scanning laser where the scan path of the laser light illumination is coordinated with the scanning of the microdisplay image.

Because the control of the lighting elements is so critical, in addition to processing the pixels for the image modulator 244, DOP 230 performs the processing for controlling the display light sources 270. In a preferred embodiment the display light sources 270 include multiple individually controlled elements, such as with an LED array, and DOP 230 may perform extensive processing to determine intensity levels for each of the LEDs. Based on the levels calculated by DOP 230, the display light controls 255 can control brightness signaling for a group of LEDs or for each individual LED. Brightness may be controlled via analog current or voltage techniques, or via a digital Pulse Width Modulation (PWM) means. Various forms of In one example, a projection system may use an array of individually controlled LEDs as the light source combined with a DLP microdisplay as the image modulator. The LEDs may be white and be used along with a color wheel or other color system, or multi-color LEDs may be used. White LEDs have the advantage of producing more lumens per watt so are more efficient. However, the wavelength of a white LED can not typically be controlled and the phosphors used for white LEDs may be difficult to match for uniformity. In a traditional LED projection lighting system, the lens and filter assembly for the LEDs is designed to produce consistent uniform illumination across the full display. For such a system, the LEDs can be carefully chosen through binning and controlled as a group where any individual differences of the LEDs are either compensated or not a problem due to the combining nature of the filters and lenses.

In a preferred LED projection lighting system, the LEDs are individually controlled and the lens system is designed so that the individual LEDs have a particular affect on corresponding regions of the display. The combination of controlling the LEDs and the region-based illumination enables enhancing the dynamic range and color gamut across the display. Various techniques in the design of the lenses can be used to achieve different patterned regions with different overlap and different focus and "roll off" characteristics. It is important that the LEDs can be controlled such that the lenses allow a uniform brightness across the display when desired. The lens system may include various small lenses (lenselets or micro-lenses), each corresponding to one or more LEDs, that project and shape the light sources. The lenselets may be formed from separate optical components and held in place by a carrier. Alternatively a single optical component may be molded, etched or otherwise scalloped to form multi-focused micro-lenses with a carrier to maintain proper position relative to the LED light sources. Other Fresnel lenses, refractive micro-lenses or other focusing techniques may be used to help direct the LED light sources to particular areas of the display.

Hybrid lighting systems consisting of multiple planes of lighting may also be designed for projection or direct view systems. For example, an UHP lamp can be combined with controlled LEDs, or an LED backlight system can be further enhanced with OLED, NED or other FED based imaging planes. Special location based systems and game machines may combine projection systems with other light sources to achieve different effects. Enhanced environments can be created by combining various light sources, such as lasers and strobe lights, both within the display and within the viewing environment.

Optical Sensors 246 of various types may detect light levels and light wavelengths within the display system and may also detect ambient external light conditions. Sensors may be single wavelength based or may be tristimulus sensors that more accurately mimic the behavior of the human eye. Other more sophisticated optical sensor systems may include imaging sensors, such as cameras that record the images produced by a projection system. The cameras may be part of the assembled display product, or may be used in the production and factory setting of the system and not shipped as part of the product. The optical sensors 246 may require various conversions from analog to digital as well as other signal processing steps that may be performed within the optical sensors 246 module, with an external processing module (not shown) or within the DOP 230. The sensor feedback may be parameterized separately or incorporated into the general display parameters.

Both the DIP 210 and the DOP 230 may have one or more memory buffers, frame buffers, line buffers or caches that can be used by their respective processing. The use of memory buffers is an important consideration as it can affect cost and performance in the design of a system. Of particular note is the use of pipelining operations to reduce overall latency through the system. Where possible, line buffers are used for on the fly processing and frames are stored for processing of subsequent frames. If processing of a current frame requires full access to that frame, then a full frame of latency is added.

DIP 210 and DOP 230 may processes image data in a high-precision internal format to preserve detailed image information, because such information can be lost in each of the various image processing steps if the internal image format has lower precision than the output of image modulator 244. DIP 210 and DOP 230 for example, can produce and maintain a processed image having four times (doubled vertically and horizontally) higher pixel resolution than the spatial resolution output of image modulator 244. Similarly, the internal format for each color component may be maintained at 32 bits or more, such as with floating point values, during the image processing even though the image modulator may be limited to 8 bits per color component. Pixel address information may also be processed with much greater precision using an extended integer or floating point representation than will be ultimately output to the image modulator 244. In a later processing step, the higher internal resolution, color representation and pixel address information may be dithered or otherwise processed to match the required output resolution and format of the image modulator 244.

Figure 3:
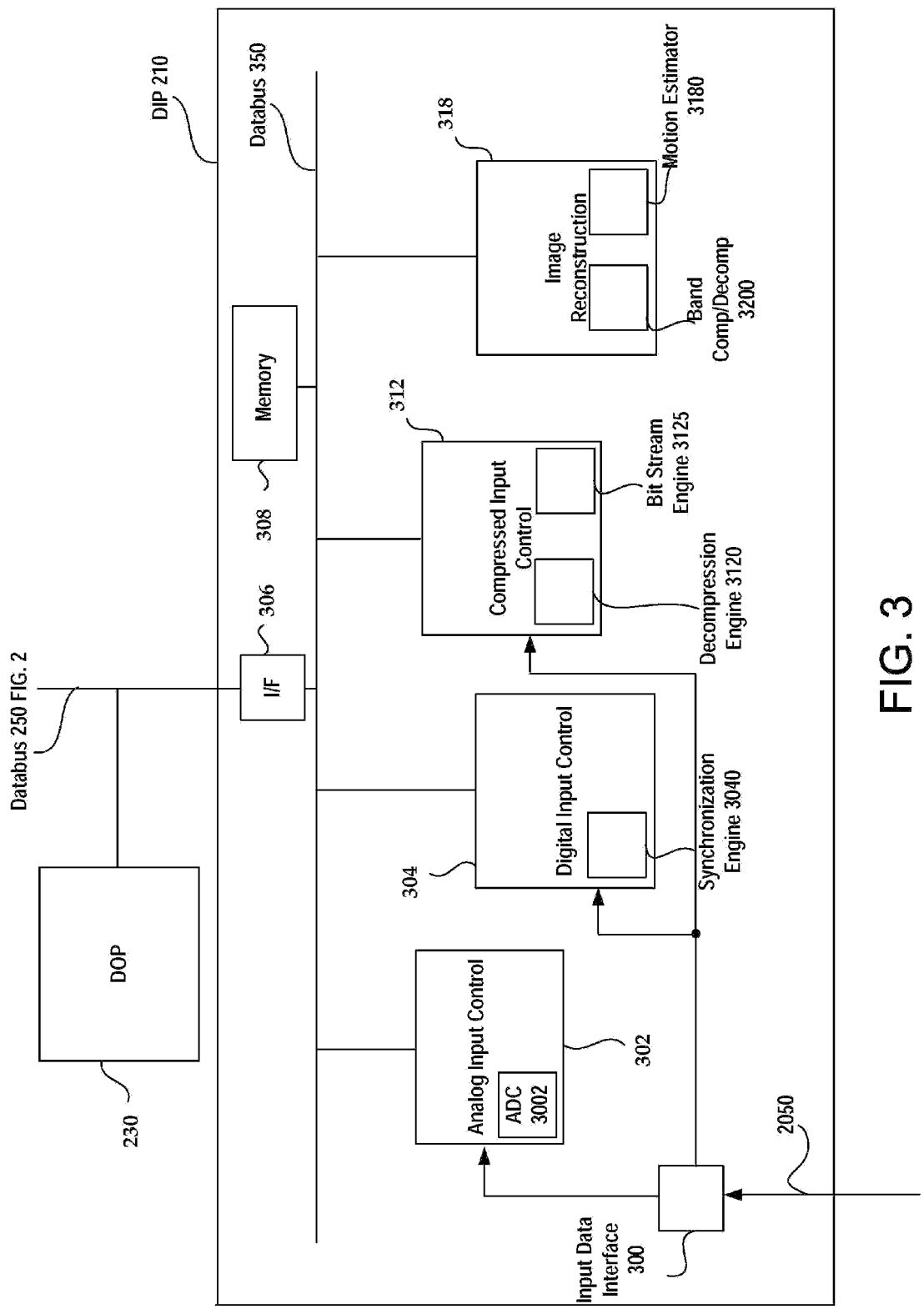
FIG. 3 is a block diagram of one embodiment of the FIG. 2 DIP 210 in accordance with the invention.

FIG. 3 is a block diagram of FIG. 2 DIP 210 which includes image processing modules Analog Input Control 302, Digital Input Control 304, Compressed Input Control 312, and Image Reconstruction (IR) 318, all connected to a common databus 350. Interface 306 can isolate the DIP 210 from the DOP 230 and utilize an interface databus 250 that may follow an industry standard or proprietary format. DIP 210 also includes one or more input data interfaces 300 for receiving image data input on line 2050 from system 200. The image data may include one or more of analog video, digital video, non-tuned data, graphics data, or compressed data. Analog video data may be in a native video format such as composite video, S-video, or some component YUV/YCrCb. Non-tuned data, received from a broadcast delivery system that may have many channels on a common carrier, may require a tuner included in or separate from DIP 210 so that relevant data can be tuned from the channels.

Digital input data may be in an RGB data format or a YUV based video format. Compressed data may be encoded in MPEG-2, MPEG-4 including H.264, Wavelet encoded or another compressed format, which may include video and audio content. The compressed format may include subband encoded data that includes multiple resolutions of the input image frames. Input data may be in a variety of standard and high definition field or frame based formats that also may differ in the aspect ratio of the input image and may differ in the frame rate of the input image. Image data on line 2050 may be encrypted for security and thus require decryption by DIP 210.

DIP 210 also receives, accompanying the image data, various control data including for example selected inputs, data types, Vertical Blanking Interval (VBI) data, and overlay channel information for the On-Screen Display (OSD), and provides this control data to DOP 230. Each of the image processing modules, Analog Input Control 302, Digital Input Control 304, and Compressed Input Control 312, preferably receives image data from interface 300. A system processor (not shown) preferably uses user-selected input controls to select image data, which is appropriately processed by each of modules 302, 304, and 312, and then preferably stored in buffer memory 308. The system processor also uses the user input commands to control windowing for picture-in-picture displays, OSD information, and other system windowing capabilities. DIP 210 preferably processes images in either YUV or RBG formats.

Analog Input Control 302 preferably includes an Analog-to-Digital Converter (ADC) 3002 which samples the analog data inputs and produces digital data outputs. ADC 3002, to achieve high quality, samples its input data frequently and precisely enough that the image can be reconstructed from the sampled data points. Additional prior art techniques for sub-carrier demodulation are used to extract the video data from the analog input signal.

Digital Input Control 304 preferably includes a synchronization engine 3040 and processes digital data, which may be in a YUV video or a digital RBG format. Since the data is already in digital format, Digital Input Control 304 does not include an ADC. Digital Input Control 304 also uses high-speed digital data transmission techniques and may include physical or electrical interfaces such as Low Voltage Differential Signaling (LVDS), Digital Visual Interface (DVI), High Definition Multimedia Interface (HDMI), Video Electronics Standards Association (VESA) DisplayPort, or Serial Digital Video Output (SDVO). These interfaces may include line termination, voltage control, data formatting, Phase Lock Loops (PLLs), and data recovery to assure that Digital Input Control 304 properly receives the digital data input. Other packet based inputs such as VESA Digital Packet Video Link (DPVL) or a tile based selective update technique may also be supported over the DVI or HDMI inputs. Other packet and descriptor based inputs may be supported over a network input.

Compressed Input Control 312 may support interface inputs such as a version of 1394A, 1394B or another 1394 format, Universal Serial Bus (USB) or a type of network interface, and preferably includes a decompression engine 3120 and a Bitstream Engine 3125. Network interfaces may include wired interfaces such as 10/100 Ethernet, Gigabit Ethernet, Multimedia Over Coax Alliance (MOCA), Home Phone Network Alliance (HPNA), various power line based networks, or some other type of wired interface. Wireless Networks may include WiFi (also known as 802.11 with A, B, G, N, I and numerous other variations), Ultra Wide Band (UWB), WiMAX or a variety of other wireless interfaces. In each case, a network interface (not shown) manages and terminates the network data traffic to provide a digital bitstream to the input data interface 300. The data may be additionally formatted either inside or outside the DIP.

The compressed data will usually include audio, video, and system information. System information may identify the bitstream format. Compressed Input Control 312, by performing additional steps such as error checking of coded input, assures that it properly receives the data and that the data is not corrupted. If the data is corrupted, Compressed Input Control 312 may correct, conceal or report the corruption. Compressed Input Control 312, once having correctly received the data, de-multiplexes the data into audio, video, and system streams, and provides the audio streams to an audio subsystem (not shown) for decoding and playback. Compressed Input Control 312 decompresses an encoded bitstream input, but retains relevant motion vector information for use in further processing.

Bitstream Engine 3125 may be combined with Decompression Engine 3120 to optimize reconstruction of compressed input bitstreams into enhanced video frames. If the compressed input bitstream was encoded using subbands, the reconstruction steps preserve the highest quality subband images at each resolution that was encoded. The bitstream information may include compliant video coded bitstreams, bitstreams with side information, layered codings for video and special bitstreams that have additional detail information leaked into a compliant bitstream. Lower-layer coded data can reveal object shapes and other information that can be exploited to provide enhanced spatial and temporal rendering of blocks constituting images. Decompression engine 3120 can perform the prior art steps of decoding a standards-compliant bitstream into a decoded frame.

Bitstream Engine 3125 processes MPEG-2 bit streams including the image blocks (or macroblocks). Most video frames within a sequence are highly correlated and Bitstream Engine 3125 exploits this correlation to improve rendering. Bitstream Engine 3125 also employs motion estimation techniques for motion compensated prediction as a method of temporal processing across image frames. Bitstream Engine 3125 can track the flow of video data prescribed by the prediction blocks belonging to the macroblocks within the bitstream, rather than re-estimating motion or creating the macroblocks similarly to a second pass encoding process.

Conventional analog multi-sync displays could support display modes of varied refresh rates. More modern digital displays have been designed to convert all incoming frame rates into a common display output frame rate, often producing motion artifacts. Unlike conventional displays that operate at a fixed frame rate, the modulated light source and image modulator based system of the present invention may support dynamic adjustments to the display frame rate. Compressed Input Control 312 may preserve the frame rate information for incoming content sources. This can be done based on simple content frame rate information such as film source detection, or can be based on object tracking within the content itself. IR 318 may perform content driven frame rate control based on object tracking. For each method, DOP 230 utilizes this information to achieve more accurate motion portrayal for a variety of content sources operating at different frame rates.

Bitstream Engine 3125 tracks the prediction blocks over several frames in which the temporal path of the prediction blocks delineates a coarse trajectory of moving objects. This coarse trajectory can be refined by additional sub-block motion estimation and bitstream processing performed either in the Bit Stream Engine 3125 or by the Motion Estimator 3180. Bitstream Engine 3125 preserves the motion vector information for later use in generating DOP 230 output frames in conjunction with motion compensated temporal filtering and other filtering and enhancements related to color representations. The information can also be used for constructing a special block filter for post decompression filtering of the coded input stream so that IR 318 can filter artifacts of block boundary edges. Other information from the Bitstream Engine 3125, such as the error terms for the macroblocks, indicates how much quantization took place for each block and the IR 318 enhancement steps can utilize this information for noise reduction filtering and any color enhancement processing.

Each input control block may include its own line buffers and memory for local processing and each may make use of a common memory 308. Memory 308 receives data from Analog Input Control 302, Digital Input Control 304, and Compressed Input Control 312, and provides the data to Image Reconstruction 318. Memory 308 also stores IR 318 input frames and output frames. The Image Reconstruction 318 can provide the data through interface 306 to databus 250 or a Direct Memory Access (DMA) engine may be used to transfer the data to databus 250. Databus 250 may be used to transfer data to DOP 230 in an expanded resolution, expanded color range or other enhanced format generated by DIP 210 which differs from the format of the input data that entered DIP 210 via 2050. IR 318 preferably includes a Motion Estimator 3180 and receives image data from Analog Input control 302, Digital Input Control 304, Compressed Input Control 312, or from buffer memory 308. IR 318 processes data based on data types.

For example, if data in YUV format requires a conversion to the RGB domain, then IR 318, through either mathematical calculations or a look-up table, converts YUV values to RGB color space and may use an extended range representation of the color component values such as 32 bit integer or floating point. Additionally, YUV data is often sub-sampled, that is, one UV pair may correspond to two or four Y values. Consequently, IR 318 uses the UV values to interpolate and create RGB pixels. If YUV data is interlaced then IR 318 converts the data from field based (sequential half frames) to frame based. IR 318 stores each field in buffer memory 308, then filters, analyzes, and combines the fields to generate an input image frame. IR 318 preferably uses the processed image frames and the motion information created by DIP 210 while the frames and the information are still in their digital format. If IR 318 processes data, such as overlay information, relevant to image modulator 244 (FIG. 2), IR 318 provides such data to DOP 230 to later be combined with the image data frames. IR 318 may process multiple input data streams in parallel and provide such data to DOP 230 to later produce a picture-in-picture display of multiple images. IR 318 also does post decompression filtering based on block boundary information included in the input bitstream.

For analog video inputs, IR 318 preferably uses techniques, for example, from Faroudja Labs, that can sample and reconstruct input video, which includes composite, S-Video, and Component (Y, Cr, Cb) that may follow one of the industry standards such as Phase Alternative Line (PAL) or the National Television Standards Committee (NTSC). To spatially filter for high quality image frames, IR 318 preferably uses various noise reduction techniques such as recursive, median filter, and time base correction.

In the present invention, IR 318 takes account of multiple input images and then, to enhance the resolution of those images, uses super-resolution techniques that employ data shared by different input frames to reconstruct an image, and thereby to produce each output frame. This cannot be done by independently using one input image at a time. The invention is thus advantageous over prior art systems which use super-resolution techniques for generating high-resolution still images from a video sequence, but not for generating real time output frames. This multiframe super-resolution technique can generate an image data superband that represents the input image with higher, typically double, the resolution of the input data. The super-resolution techniques used by the invention depend on a high correlation of the data between frames, and require a sub-pixel shift of the input images which is typically based on the movements of objects in the video image sequence. IR 318, in correlating images to reconstruct output frames, uses motion vectors provided by Motion Estimator 3180 or preserved from the input bitstream. IR 318, while generating still frames, can use mathematical equations from, for example, deterministic techniques of Projections On Convex Sets (POCS) and stochastic techniques of Bayesian enhancements.

When an image does not include motion vector bitstream information, Motion Estimator 3180 preferably uses techniques such as optical flow, block matching, or Pel-recursion to estimate motion that tracks the image object motion in time. Motion Estimator 3180 can also use the same motion estimation techniques in conjunction with MPEG-2 motion vector bitstream information. Motion Estimator 3180 compares groups of pixels from one image field to those of subsequent and previous image fields to correlate object motion. Motion Estimator 3180 then records the detected motion relative to the field position so that DOP 230, together with input frame information and IR 318 motion information, can later generate motion-compensated image frames. For compression systems, Motion Estimator 3180 finds the best match between frames, then codes the mismatches. Motion Estimator 3180 masks out motion vectors that do not meet a certain level of matching criteria, and tags the vectors that have a high level of matching so that these vectors can subsequently be used in more refined motion tracking operations, which are performed on smaller image blocks or on individual pixels. Motion Estimator 3180 thus differs from prior art techniques in which video compression systems use the detected motion as one of the steps to compress the number of bits needed to represent a video sequence. Motion estimation is not used in a standard compliant decoder that simply performs motion compensation using the coded motion vectors and macroblocks. Consequently, the invention, via Motion Estimator 3180, advantageously provides better quality images than prior art techniques.

Because detecting motion is important in restoring images, Motion Estimator 3180 (and other processing modules according to the invention) tracks motion on a sub (or smaller) block basis. For example, instead of on an 8×8 (pixels) block, Motion Estimator 3180 tracks more refined motions on a 2×2 block. To reduce the need to track refined sub-blocks, Motion Estimator 3180 uses the coarse block matching differences to pre-qualify a block, and thus does not perform refined tracking on blocks that are poor matches. Conversely, Motion Estimator 3180 does perform refined tracking on blocks that are close matches.

When receiving motion estimation vectors, such as those provided in an MPEG data stream or another temporal encoding scheme, Decompression Engine 3120 uses all of the vectors for compliant MPEG decoding. IR 318 then uses vectors with better block matching in analyzing refined motions for restoring multiple frames. Analyzing refined motions can produce motion vectors for sub-block pixel sizes, which can be used in multiframe reconstruction to better produce high resolution output frames.

IR 318 preferably separates its output images into video fields or frames, and creates a pointer to the start of each field (or frame). Either the actual field (or frame) data or pointers to the field (or frame) data may serve as inputs to DOP 230. Sequential fields can be used to achieve high resolution with an increased field rate. When the output frame rate is known, IR 318 is able to correlate the various movements of frames and objects from the incoming data stream and produce motion compensated fields or frames that are highly correlated for sequential output.

IR 318 outputs (and DOP 230 outputs), having been reconstructed in accordance with the invention can have a higher resolution than the standard input resolution and can be stored as an image superband. IR 318 outputs can be stored in memory 308 or in a metafile that includes a description of the image both in a spatial RGB frame buffer format and in a semantic description of the image objects, textures, and motions. The digital processing system of the DIP 210 utilizes techniques such as super-resolution to produce images that have higher resolution than the individual input images. Other analog techniques are used in the DIP 210 combined with the super-resolution techniques for producing the high-resolution internal representation of the images.

IR 318 also includes a subband decomposition block 3185 for generating multiple lower resolution images of just-constructed very high quality image frames from input data that was not previously subband encoded. Subbands are typically constructed at steps of one half resolution of the prior step. Subbands can be generated from any image frame including from frames that were decoded from compressed data input that was not prepared for subband encoding. The various techniques described to improve image quality, along with other filtering modes, are used to construct the highest quality image subbands. These subband images, combined with the superband image generated at higher resolution, provide the image data for the Display Output Processing (DOP) steps described with reference to FIG. 4 below.

Other than the previously described scheme of utilizing wavelet encoded subbands of image data as the input, in accordance with the invention, a geometric transformation may also be used for processing the input data that includes other forms of layered coding video bitstreams. This geometric transformation may either be performed as part of GT 404 in the DOP, or alternately a Geometric Transform Module may be included as part of the Image Reconstruction 318 in order to reconstruct input video frames. One technique for tracking image flow is to compare the coefficient data of the input bitstream to find the same patterns across time. If the same pattern is found, it may represent the flow of an object across the frames. This technique may be applied to single camera or multiple camera systems.

With layered coding, the conjecture of image flow can be further tested in the different layers and different camera views to either confirm or reject the conjecture. Layered video coding is a technique for scalability which, for example, transmits multiple resolutions of video bitstreams where the higher resolutions utilize the bits from the lower resolution transmissions. In this coding technique, a lower resolution decoder can utilize just the portion of the bitstream required to generate the required resolution. A decoder that requires higher resolution will use the bitstream of the lower resolution and of the additional layers in order to create the higher resolution image.

Layered coding techniques may include other types of compressed data, such as wavelet data, to enhance a base level transmission. For example, wavelet data may be included as a layered stream of data. Wavelet data does not use the same Discrete Cosine Transform (DCT) compression scheme as the standard video portion of MPEG video data. As part of the MPEG syntax, the wavelet data could be coded as a private video data stream, or could be part of the video program stream and indicated in the program header information. The wavelet information represents a higher resolution image for a complete or partial frame for some or all of the MPEG frames. When an MPEG frame that has corresponding wavelet information is decoded, the IR 318 combines the MPEG data with the wavelet data. Because of the different characteristics of DCT and wavelet-based compression, the combination is used to produce a single high quality output frame.

A multiple camera system (or another system designed to create 3D content) combined with a multi dimension playback system can also take advantages of a layered coding technique. Existing television broadcasts that include 3D viewing information includes such information in the base layer of the broadcast. As part of the base layer, the encoded information is shown to all viewers regardless of their desire to utilize the 3D information. For example, a system based on anaglyphic 3D images typically utilizes Red/Blue, Red/Green or Red/Cyan glasses to present the content in 3D. Viewers who are not wearing the appropriate glasses see the aberrational effects of the 3D encoding. Such effects are seen as multi-color ghosting and are not desirable. Because the anaglyphic 3D images are included in the base layer, there is no way to turn them off even if a viewer does not want to wear the glasses. Like anaglyphic encoding, other 3D viewing systems generate a unique right and left eye view of the image and use color filtering, shutters or another technique for each eye to see the appropriate view.

A preferred embodiment of the present invention uses a layered coding method to encode the "3D viewing" information in a manner such that the base layer may be decoded into a standard high quality image that can be viewed normally. The "3D viewing" information is included in an additional layer of information where the DIP 210 is able to preserve and process the additional information and generate the right and left eye views of the image if the user indicates a desire to do so. For users that do not want the 3D images, the additional layer is ignored and the base layer is displayed normally. Several available supplemental information encoding techniques have the goal to include a very high quality base layer video and to be able to generate the right and left eye views from a smaller amount of layered side information. The Image Reconstruction 318 may be used to perform the processing to combine the base layer video with the information in the additional layers to produce the left and right eye views. For a traditional 2D display device, the right and left eye views are then combined into a single encoded 3D viewable image. For a special 3D display, the right and left eye views may be processed and displayed on separate surfaces for enhanced 3D viewing.

Figure 4:
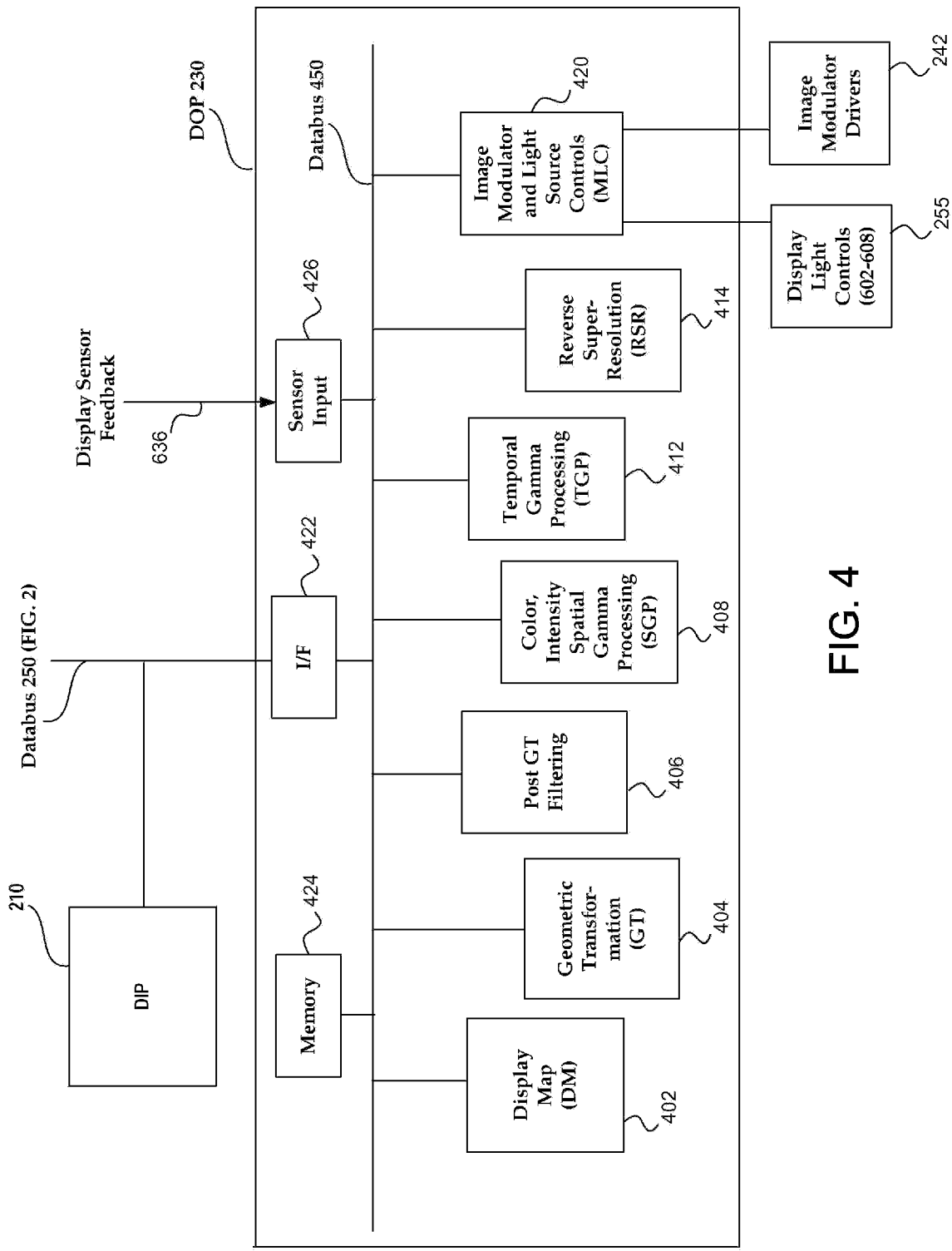
FIG. 4 is a block diagram of one embodiment of the FIG. 2 DOP 230 in accordance with the invention.

FIG. 4 is a block diagram of FIG. 2 DOP 230, which includes the processing blocks for a projection system along with the processing for an image modulator and light source controls. Specific to a projection system is the Geometric Transformation 404 and Post GT filtering 406. The other processing modules including color, intensity and Spatial Gamma Processing (SGP) 408, Temporal Gamma Processing (TGP) 412, image modulator and Light source Controls (MLC) 420 and Reverse Super-Resolution (RSR) 414, are all connected to a common databus 450. Databus 450 satisfies system bandwidth and concurrency requirements for parallel image processing. DOP 230 also includes buffer memory 424, which stores data frames and image subbands for use by each of the processing modules 402, 404, 406, 408, 412, 414 and 420, although each of these modules may include a local memory buffer (not shown).

There is also a image modulator and light source control block (MLC) 420 which connects to the image modulator 244 via image modulator drivers 242 and the display light controls 602-608 circuits. A system designed for flat panel display systems would not necessarily include the Geometric Transform 404 or the Post GT filtering 406 processing modules. While both a projection system and a flat panel display system would typically have a Display Map 402, the specific information stored and utilized within the Display Map 402 would differ depending on the type of display system.

The DM 402 may store pixel and LED mapping and compensation data based on individual pixels and LEDs or groups thereof. User settings and sensor feedback may affect the DM 402 mapping information. Some of the compensation data considered for display map 402 may be stored in memory 424 or alternatively within the display light controls 255, image modulator 244, image modulator drivers 242, or within the circuitry associated with the light sources 102. The system may also include other circuitry (not shown) that is designed to more specifically perform dynamic gamma correction for the image modulator pixels and for the LEDs and that may include dedicated non-volatile analog or digital memory that stores gamma correction tables. Sensors for environmental conditions such as ambient lighting and ambient temperature may be shared by the different compensation circuits or may be replicated.

DOP 230 receives DIP 210 outputs either directly over databus 250, via buffer memory 308 or via buffer memory 424. Utilizing databus 250 allows a separation of the DIP 210 and DOP 230 that can allow for a convenient partitioning where the DIP 210 may be able to perform image reconstruction of various inputs without specific knowledge of the type of display. Databus 250 may be instantiated as an internal bus within a System On Chip (SOC), a bus on a Printed Circuit Board (PCB) between chips, some type of ribbon cable or connector between subsystems, or another type of interface. The DOP 230 processing could begin from the processed and reconstructed input image and specifically process the images for specifics of the display. Alternatively, in a more highly integrated system, some or all of the DIP 210 processing elements may be combined with some or all of the DOP 230 processing elements and the DIP 210 memory 308 may be combined with DOP 230 memory 424. DOP 230 processing could also utilize image data that has undergone wavelet or subband decomposition during the DIP 210 processing steps.

DOP 230 can use pointers (if applicable) to directly access DIP 210 output data. DOP 230 also receives multiple DIP 210 output images for performing picture-in-picture operations where a single image output frame will include more than one processed input video frame. DOP 230 combines overlay data both from the input coded data and from any On-Screen Display (OSD) information such as a user menu selection provided by the system microcontroller (not shown). DOP 230 processes its input images and outputs image data including display coordination for both video and data output, and data and control signals for each R, G, and B image color component.

MLC 420 is used to sequentially control the various LED lights as well to control the scanning of the image modulator. Due to processing complexity or other partitioning reasons, a single DOP 230 or MLC 420 may not be able to fully control the entire display. Some systems may be designed with multiple DOPs 230 or MLCs 420 where each performs the controls for one of the color planes. In another partitioning, the light control portion of the MLC 420 is separate from the rest of the DOP 230 and multiple MLCs 420 may be used to control different color planes. In such a configuration, the image modulator controls may be performed by another block within the DOP 230, a MLC 420 or by another controller. DOP 230 processing may also be split spatially where multiple DOPs 230 are used for different portions of the display.

The various DOP 230 functional blocks, image modulator drivers 242, display light controls 255 and other circuits may be partitioned in different ways. SOCs may partition the various elements into a variety of monolithic IC combinations. In addition, multi-chip modules may utilize the different monolithic IC combinations along with elements of sensors 246, display light sources 270 and image modulator 244.

In another preferred embodiment, less appropriate for sequential color systems, the DOP may have completely separate paths for the image modulator and display light controls. The image modulator path may be unaware that the display light sources 270 are being modulated. For example, a standard LCD television display system may be enhanced with an LED backlight system with no changes made to the LCD image panel or controls for the panel. Similarly, a DLP projection TV may utilize the existing color wheel and DLP assembly while changing only the light source to an LED based light source. A television manufacturer may prefer such as system as it allows more manufacturing flexibility. A single display system and image modulator can be designed and manufactured to work with either traditional constant light sources or with a more advanced modulated light source system. Though some of the more advanced techniques of controlling the image modulator 244 based on the display light controls 255 may not be possible in a system with separate paths, the manufacturing flexibility may be an important consideration.

SGP 408 converts YUV to RGB color space and determines the intensity values for each of the R, G, and B color components of the image modulator and, where used, the colored LEDs. Those skilled in the art will recognize that a color space conversion is not necessary if the image is already in the RGB color space. SGP 408 preferably uses a look-up table, in which each of the R, G, and B color components has values corresponding to color intensities, to translate image colors. Each R, G, and B intensity value represents an index into the look-up table, and the table provides the output (or "translated") value. SGP 408 independently processes each R, G, or B color component and maps each color component based both on a combination of individual RGB values and on RGB values of surrounding pixels. SGP 408 may be used in determining field sequential display values for both the image modulator and the LED values where multiple fields, each using multiple colors, are used for each frame output. For image modulators that utilize an arranged matrix of color filters (such as a Bayer pattern), the SGP 408 may start with a high resolution representation and further correlate each pixel output with the surrounding pixels to achieve a higher resolution representation.

Some displays have non uniform brightness and color issues that result from the design of the system. For example, if the LED light sources are not able to provide a uniform light intensity, then a mapping can be created where SGP 408 may adjust the RGB values of the pixels in the identified area and of the pixels in the neighboring area to compensate for non-uniformities of the display. Color and Spatial Gamma Processing 408 uses mathematical calculations, a Color Look-Up Table (CLUT), or a combination of the two to provide the RGB values for mapping the input pixels to the desired image outputs. SGP 408 may utilize information from DM 402 in determining compensation data values. SGP 408 may also work in conjunction or sequentially with other compensation circuits in the image modulator and LED paths.

A gamma table allows for a non-linear mapping of frames or fields. This enables input colors represented by RGB values to be adjusted (emphasized or de-emphasized) during the mapping process, which is useful for crosstalk suppression, color calibration, correction for ambient lighting conditions and for compensation of shortcomings in a color gamut of image modulator 244. In another example, colors that were produced for a movie screen or CRT based system may require further enhancement in order to achieve the desired levels when used with an LCD system. SGP 408, to realize a non-linear relationship, uses a translation table represented by a number of bits that is larger than the number of data input bits. For example, if eight bits represent $2^8$ (=256) color component intensity values, then Color and Spatial Gamma Processing 408 uses, as another example, 10 bits to represent $2^{10}$ (=1024) translated values. A system manufacturer maps 256 values to 1024 translated values.

Displays that can display both very dark black as well as very bright light colors are said to have a high contrast ratio. Achieving high contrast ratios with LCD-based flat panel displays is typically difficult as the LCD material has difficulty blocking out all of the light from very bright backlights for display images that are meant to be very dark. Additionally, image modulators may attenuate the light source for display images that are meant to be very bright. Using low reflective coatings on the display front glass is helpful in achieving darker black colors, though it might attenuate and dull the brightness and colors. In a preferred embodiment of this invention, combining the image data processing for the image modulator 244 values and light intensity values, the resulting display image has a higher contrast ratio and increased color gamut. Color, Intensity, Spatial Gamma Processing (SGP) 408 provides processing not only for the image modulation 244 pixel data, but also for the light intensity values. The SGP 408 operates on a per pixel basis where the gamma processing per pixel will vary based on the parameters for each pixel location. In a simple embodiment for high contrast spatial processing, contrast for lights and darks may dynamically be increased where blacks are made darker and whites are made brighter with the controls for darkening and lightening including both light source modulation and image modulation.

SGP 408 may be used to determine the field and sub-pixel values for the R, G and B components and the brightness levels for the various LEDs based on their positions relative to the display screen and on the other configuration information. In a system with white LEDs, SGP 408 provides the sub-pixel values spatially and may compensate a "white" LED with varying levels of R, G and B light to achieve the right white point or color temperature. SGP 408 may perform additional temporal processing for a field sequential color system that does not have color filters. SGP 408 may provide per pixel adjustments for each field as well as provide adjustments for each LED for each field as each field is a product of both the image modulation and the brightness of the colored LEDs for that field. Prior art sequential systems that use a color wheel have a fixed timing and fixed color for each field. While it is simplest to think of sequential color fields for the LED system as being exclusively R, G or B, a preferred embodiment of this invention allows the additional flexibility of varying the field duration and the LED color combination for each field to improve display quality. Optimizing each of the multiple fields that make up a frame with respect to all of the LED colors can avoid the flickering issues and other duty cycle constraints of field sequential color displays, as explained in greater detail along with shutter control in reference to FIG. 5 and FIG. 6.

Beyond just the traditional contrast ratio, by controlling the light levels for different display frames, and within different regions of the display for a single frame, the system is able to achieve High Dynamic Range (HDR). High dynamic range usually corresponds to the physical values of luminance and radiance that can be observed in the real world. HDR image formats are sometimes considered scene-referenced instead of device-referenced and the SGP 408, TGP 412 and MLC 420 will process such HDR content with different algorithms to preserve the HDR. The system 200 can make use of additional bits of color information that were either transferred to the system via input 2050 or by Image Reconstruction 318 extrapolating such information from another type of input stream. Newer content sources such as High Definition DVD players (HD-DVD) utilizing Microsoft Windows Media, H.264 or another encoding scheme may include additional bits of color information to provide HDR content.

In another embodiment an image has a higher resolution than the image modulator can natively support. This may be a source image or an image that has been reconstructed by IR 318 or by another means. In order to display the full resolution of the source image, special processing is performed with respect to dynamic range and processing the surrounding pixels. The image is filtered down to a lower resolution image to match the image modulator. The enhanced dynamic range of the display is used so that the user perceives he is viewing a higher resolution image than would otherwise be possible with the image modulator and standard dynamic range. Sequentially displaying the image color fields is another preferred means to temporally compensate for limited image modulator resolution where each color field is sequentially displayed at the full resolution of the image modulator.

Temporal Gamma Processor 412 assures that the time related representation of an image is as accurate as possible. TGP 412 thus, based on a previous frame value and a known transfer function of the display modulation system, adjusts its output values to provide a desired output value during a desired frame. TGP 412 may processes the sequential frames and compensates by modulating transition characteristics that, due to the nature of an LCD image modulator 244, are not purely digital. TGP 412 also provides the information for the Image modulator and Light source controls 420 with the required information to overdrive the LCD image modulator 244 to compensate for the LCD material characteristics, so that the desired output can be achieved more expeditiously. Consequently, TGP 412 overcomes the video quality limitation of prior art systems that produce poorer quality display outputs. TGP 412 can also reduce the cost of the display system because the materials used for image modulation in prior art systems that provide faster image responses are usually expensive. Like SGP 408, TGP 412 may perform per pixel gamma processing.

In addition to compensating via control of the image modulator 244, the Temporal Gamma Processing 412 also provides the temporal processing for the various light sources. By utilizing the temporal processing for the light sources, the response time of the image modulator 244 pixel values can be improved. For example, if a pixel value for the color green is to change from 32 to the maximum of 255, the green value for that pixel can not be overdriven since it is already at the maximum value. However, if there is a green LED that effects that pixel, the green LED intensity value can be effectively increased such that the viewed pixel value at that location can be 255 right away even though the value at the imager may still not have fully transitioned to 255. Since the LEDs effect more than one pixel on the modulator, other compensation for both surrounding pixels and possibly for the other LEDs needs to be included in determining the right values for the overall image. The Color, Intensity, Spatial Gamma Processing 408 works in conjunction with the Temporal Gamma Processing 412 to achieve optimized controls for both the image modulator 244 and the display light controls 602-608.

Temporal Gamma Processing 412 may also be used in systems that decompose frames into sequential fields. The determination of how to decompose the frames into fields may be based on color, resolution, content or some combination of frame characteristics. The TGP 412 is combined with SGP 408 and used to adjust the image modulator pixel values and the light source values for each field. Sequential display of the TGP 412 processed fields is used to accurately reconstitute the fields back into high quality display sequences. When frames are decomposed into fields that will not be uniformly time displayed, additional TGP 412 processing is required to do time-based weighting.

For systems that support time sequencing the display through multiple colors, the TGP 412 may need to track transitions across colors for the image modulator. For example, a location of the image modulator may go from displaying a red pixel in one field or frame to displaying a green pixel in the next field or frame. In such a case, the image modulator typically only provides the intensity level while the light source determines the color. In such a case, TGP 412 may compensate for the intensity value transitions with the values for the image modulator, the light sources or both. TGP 412 may also control the blanking interval and other sequence timing for the image modulator and LEDs to optimize the display results. This preferred embodiment will be explained further with reference to FIG. 5.

For systems where the DOP 230 has knowledge of the image motion for various pixels, the SGP 408 and the TGP 412 may use motion information associated with each pixel or block of pixels in order to determine the amount of color enhancement performed. This type of processing is based on the ability of the eye to discern color information, and image resolution is affected by the amount of image motion. The motion information and subsequent color enhancement criteria may be part of the original motion vectors, error terms associated with the original motion vectors, or motion information determined from a motion estimator within the display system. By understanding the motion of the pixels, the amount of color enhancement can be increased or decreased to best optimize viewing.

Reverse Super-Resolution (RSR) 414 performs a superset of the frame rate conversion process for converting between disparate input and output frame rates, and can improve display quality when intended display images have a higher resolution than can be supported by the number of pixels of image modulator 244. RSR 414 simulates higher resolution outputs by sequencing lower resolution images at higher frame rates where each of the lower resolution images is slightly different and at a slightly different position. Thus, for example, RSR 414, block by block, spatially filters one frame in a video sequence having a transfer rate of X frames per second (fps) to Y number of RSR frames having a transfer rate of Z fps, where $Z=X \times Y$. RSR 414 then shifts by the same pixel (or pixel fraction) amount the pixel matrix representing each RSR image block. For example, because there are Y RSR frames, RSR 414 shifts the pixel matrix block Y times, once for each RSR frame, and each shift is by the same pixel (or pixel fraction) amount. The number of pixel fractions to be shifted depends on the physical characteristics of the display system and of image modulator 244. Where a system adjusts the position of the viewed image, the shift fraction corresponds to the physical movement of the viewed displayed image. Where there is no actual movement of the displayed image, the fractional adjustment is based on the physical nature of the display device such as the pixel size relative to the size of image modulator 244 and to the projection characteristics of the system.

RSR 414 then produces each RSR frame with a motion-compensated weighted filtered center so that the center of the input image for each RSR frame is maintained such that no motion artifacts are introduced. A pixel-matrix weighted filtered center is the center of a pixel matrix taking account of filter weights in a filter transfer function. Filter weights, varying depending on the filter characteristics, are the values (usually of multiplications and additions) which are combined with the input pixel values to produce the filtered image output. A filter transfer function uses filter weights to transform an input image to an output image. Output image pixels, based on a transfer function, can be adjusted to move the corresponding image. RSR 414 preferably uses image blocks having 8×8 to 256×256 pixels where each block has uniquely processed motion information. For static images, RSR 414 produces a sequence of frame-rate-adjusted output frames based on the difference between the input and output frame rates. For motion pictures, RSR 414, at the time of the output frame, portrays the intermediate position of the image and compensates for the image motion. With increased processing, each pixel or sub-pixel will have its motion information processed uniquely.

In an alternative embodiment of the invention, the RSR 414 utilizes a stationary display (image) modulator with multiple moving light sources and utilizes the RSR 414 processing to determine the lighting patterns. The lighting elements may move in a fixed pattern as dictated by a mechanical structure such as one or more rotating color wheels of LEDs. Alternatively, the lighting elements may be lit in any pattern such as by a voltage field applied to an FED or NED based backlight. For projection systems that include multi-color LEDs, the slight position differences of the LEDs combined with the lens design and the screen design may allow the RSR 414 to achieve the effect of offsetting the color fields without actually having moving parts within the system.

The RSR processing performs lighting optimizations multiple times within a frame display to improve the dynamic range and perceived resolution of the display.

While traditional filtering techniques may be used by DIP 210 and after Geometric Transformation, the GT 404 has the ability to perform the mapping of the DIP 210 superband outputs to the image modulator 244 to pre-compensate for distortions that occur during projection from the modulator to the display screen. Similarly, the GT 404 can use the DIP 210 subband outputs to perform non-linear filtering and scaling to produce the luminance mapping for the light sources. Since the resolution of the light source is typically lower than that of the original image, starting from the subband data saves on the amount of computation for determining each light source value. The filtering to produce the luminance map may follow a variety of techniques from simple weighted averaging to more complex de-convolution filtering and other types of filtering.

In an alternate embodiment of the invention, the DOP 230 processing can be used to optimize a display system for 3D viewing. The micro adjustments and high frame rates provided by the RSR 414 processing may be used to generate high quality images at a high frame rate for both the right and left eye of the viewer. The different eye views may be managed by using a mechanical micro adjustment and a corresponding filter, by utilizing the color lighting system to bias images for corresponding colored glasses or by sequencing high rate images for a corresponding shuttered viewer. With proper design, the 3D features are optionally enabled such that when they are not used the display system allows traditional viewing of 2D images and is not disadvantaged by including support for a 3D mode.

In the FIG. 4 embodiment, DM 402 stores various forms of system transfer information for use by the DOP 230 to pre-compensate the image data prior to writing to the imaging device. This information varies based on the type of display system and may have any number of parameters. For example the DM data may be a simple one-to-one map of data corresponding to image modulator 244 (FIG. 2) characteristics at chosen pixel or screen locations. DM 402, where applicable, also stores a memory description corresponding to each display pixel or a shared description of groups of display pixels or pixel sectors. Such a description may be stored in a delta or difference format where the complete information exists for one pixel, referred to as an anchor pixel, and the information for the surrounding pixels is a difference from the anchor pixel and requires less storage. Because the description does not change on a frame-by-frame basis, DM 402 preferably reads the description only once during the display process. DOP 230 then uses the description information to generate image frames. DM 402, when reading data, uses a set of control registers (not shown) that provide references to the data blocks.

DM 402 data varies and may include, for illustrative purposes, manufacturing related information, system configuration information, and user data. Manufacturing-related information may include, for example, a map of locations, usually compiled at assembly time, of defective or weak pixel display bits, correlation data of ideal radial imperfections and of optically distorted projection, and correlation data for alignment points for image modulator 244. System configuration information, through an automatic self-calibration, may include, for example, a registration map having adjustable intensity values for each R, G, and B color component and the color component pixel offset at given locations. The format for such a registration map may be based on anchor pixels where only difference information is stored for surrounding pixels. Such a registration map may be stored in flash memory or another type of non-volatile memory. In some systems, the memory for performing the gamma correction adjustments for the pixels may reside in external circuitry. The DM 402 may manage the gamma tables based on dynamic sensor feedback or the external circuitry may perform the management without DM 402 intervention.

For projection systems, DM 402, where applicable, preferably uses sensor techniques, such as sonar range finding, infrared range finding, laser range finding, or optical techniques of displaying and capturing known patterns to measure distances and distortions from a projector to different parts of a display screen (not shown). The use of image sensors and digital camera technology for the capture of images from the display screen represents a good example of optical techniques. Combined with known pattern projections, sophisticated models can be built of the projection path that include X, Y and Z displacements for different pixel locations and for triangle mesh patterns. DM 402 then uses these measurements to mathematically characterize and model a projection display system. DM 402 thus allows projecting images onto a mathematical approximation of a display screen surface. User data includes user preference information such as brightness, color balance, and picture sharpness that are input by a user during a setup sequence.

In a different implementation, DM 402 includes a triangle mesh to represent the transfer characteristics of a projection system. The triangle mesh may be non-uniform where the triangles' sizes and orientations vary over the display. The triangle mesh may be built from an importance map whose density varies in accordance with the amount of distortion for a particular area of the display. Techniques such as adaptive isosurface extraction may be used to generate the triangle mesh. Optical techniques of using cameras both inside and outside the display system can be combined with a series of known image patterns to determine the triangle mesh information. Information on the characteristics of the texture mapping hardware may also be used in determining the triangle mesh. The triangle mesh may also be modified to perform other system functions such as format conversion of 4:3 input to match the display output resolution of 16:9 aspect ratio.

Though both a flat display screen and cameras include only 2D (X and Y) dimensions, the projection distortion includes a 3D depth (Z) component. If the Z value is ignored, various types of perspective distortion may be introduced into the system. In some systems that may be acceptable and in others higher quality may be desirable. By using known patterns for projection and comparing those images with the captured representation of the image, the Z values can be determined. For example, the interpolation of a line based on X and Y vertices where no Z value is included may appear as an arc which indicates perspective distortion, since the combination of the X and Y displacement and the Z displacement all contribute to the warping of a line into an arc. Those skilled in the art will recognize that by varying the input pattern along with recording the viewable pattern, a "curve fitting" algorithm can conclude the proper X, Y and Z vertex values for a tessellation map to best represent the distortion of the projection path. Once the proper X, Y and Z values for the vertex are used, the interpolation across triangles will result in straight lines that are not distorted into arcs. The tessellation map of the proper vertex values is used during the texture mapping modes as described elsewhere in this disclosure.

The display tessellation map will include the location information for each triangle vertex and may also include other color and intensity information either as part of the same triangle mesh or in a separate triangle mesh. In a system that includes a more sophisticated setup procedure, the vertex information will include differing Z values (depths) for each vertex. Each color component may require different mappings to represent how the color path varies over the complete display surface. A triangle mesh can be ordered as individual triangles, triangle strips, triangle fans or some other organization. Other mathematical representations such as B-Spline may also be used. DM 402 preferably provides data, either directly or through buffer memory 424, to Geometric Transformation module 404.

In accordance with the invention, Geometric Transformation 404 advantageously redefines the spatial relationship between pixel points of a compensated digital image that, when displayed, exhibits the highest possible image quality. Geometric transformation, also referred to as warping, includes image scaling, rotation, and translation. Geometric Transformation 404 resamples data to produce an output image that can readily map onto FIG. 2 image modulator 244. However, the Geometric Transformation 404 output data points, due to scaling or resampling, may not correspond one-to-one to data points of the image modulator 244 grid. Consequently, DOP 230 includes Post Geometric Transform Filtering 406 to filter the transformed data samples from Geometric Transformation 404 and thereby produce an output pixel value for each data point of image modulator 244. Since the modulator is a 2D device having points in an X and Y plane, the transform includes mapping any depth information onto the 2D device. Post Geometric Transform Filtering 406 uses spatial filtering methods to smooth the image and to resample, and thus properly space, the data samples.

Geometric Transformation 404 also improves display image characteristics related to image modulator 244 and the display system. For image modulator 244 screen regions that have more image modulator 244 pixels than screen 260 has pixels, Geometric Transformation 404 adjusts the pixel values by a spatial filtering to reduce differences in neighboring pixel values. Consequently, the corresponding image is smooth and does not contain artifacts. For screen display regions that have fewer image modulator 244 pixels than screen 260 has pixels, Geometric Transformation 404 uses edge enhancement filtering to increase differences between neighboring pixel values to pre-compensate for distortion that will be introduced when image projection spreads out neighboring pixels.

Geometric Transformation 404 preferably uses filtering algorithms, such as nearest neighbor, bilinear, tri-linear and anisotropic filtering, cubic convolution, sync filters, or cubic spline interpolation, to process images and thus produce accurate interpolated image pixel values. Further, where multiframe reconstruction requires, Geometric Transformation 404 uses time-varying multiframe filtering methods including deterministic techniques such as Projection Onto Convex Sets (POCS), and stochastic techniques such as Bayesian filtering. Based on the computation complexity, Geometric Transformation 404 chooses an appropriate filtering technique. For clarification, anisotropic filtering is a method of enhancing the image quality of textures on surfaces that vary in distance and may be angled with respect to the distance. Anisotropic filtering may use a single texture map, like bilinear, or multiple texture maps like trilinear where anisotropic filtering has the added advantage of introducing less blur in the process and thus preserves more detail. Anisotropic scaling occurs when something is scaled by different amounts in different directions. An example is scaling a 64×64 source pixel texture to cover a 14×30 pixel output rectangle.

Geometric Transformation 404 can improve image deficiencies related to the screen 260 environment. Geometric Transformation 404 performs a spatial projection which warps the image to compensate for a curved display screen 260 as is usually used in front projection theater systems, and subsequently uses bitstream information to improve the image. For example, if it can acquire the depth of moving objects, Geometric Transformation 404 can reduce the distorted motions at the edges of a curved screen 260. Geometric Transformation 404 constructs an optical flow field of the moving objects along with the object distance information. Geometric Transformation 404 then uses motion adaptive filtering to construct a sequence of output frames that position the objects at the proper spatial coordinates in the time domain. Geometric Transformation 404 thus, during projection onto a curved screen 260, conveys the proper motion of all objects in a scene. Geometric Transformation 404 also works in conjunction with an optical correction to ameliorate distortions resulting from the different focal distances from a projector (not shown) to different parts of screen 260. Geometric Transformation 404 uses the information from optical based pattern projection and capture techniques (discussed above) that model the screen 260 environment and then uses the model in the form of a display tessellation map to mathematically compensate for image distortions. Geometric Transformation 404, to correct a warping distortion produced by an optical system, uses similar triangle based display tessellation mapping of a flat screen to apply to a curved screen.

The transfer function for the path from the image modulator 244 to the display screen 260 changes if the display screen is curved. The curve of the display screen becomes part of the transfer function of the display system. The geometric transformation can incorporate the curved display screen contribution to the transfer function and the tessellated triangle mesh values and compensate accordingly. The benefit of incorporating the screen curvature in the transfer function is that the geometric transformation operation only needs to be performed once to compensate for both the system distortions and the screen curvature.

Geometric Transformation 404 uses special processing, similar to the curved screen 260 processing, for various Head-Mounted Displays (HMDs). An HMD is a display unit combined with a helmet or glasses that a user wears, and usually includes two image modulators 244, one for the right eye and one for the left eye. HMDs are useful for a single viewer and, because of their physically smaller area, they typically display high quality images with increased pixel density.

Geometric Transformation 404, without considering motion adaptive filtering, treats image spatial projection with warping onto a curved screen 260 in the context of 3D graphics. Geometric Transformation 404 considers a display image frame as a 2D texture and considers a curved surface as a 3D surface. Geometric Transformation 404 then maps the 2D texture, which may be video, onto a surface that is the mathematical inverse of the curved screen 260. Geometric Transformation 404 thus pre-corrects the image frame so that, when projected, the mapped image will have filtered out the distortions associated with a curved screen 260.

Geometric Transformation 404 preferably employs techniques such as anisotropic filtering to assure that the best texture is used in generating output pixels (see Marc Olano, Shrijeet Mukherjee, Angus Dorbie, "Vertex-based Anisotropic Texturing," *Proceedings of the* 2001 *SIGGRAPH/Eurographics Workshop on Graphics Hardware* (Los Angeles, Calif., Aug. 12-13, 2001), ACM SIGGRAPH, New York, 2001). Instead of using the simpler bilinear single texture resolution, texture samples are best used from the different subband and superband representations of the image frame in what is associated with tri-linear modes. By providing the different bands, the anisotropic filtering can utilize texture samples from more than one resolution of the texture much like in the tri-linear modes but with the added processing of the anisotropic filtering. Geometric Transformation 404 also preferably uses filtering techniques such as sync filters, Wiener deconvolution, and POCS, and/or other multipass filtering techniques to filter the images off-line and then output the filtered images onto a film recorder. While it is possible for a Geometric Transformation 404 to sample all of the desired pixels from a single image map and produce the desired output, GT 404 may also allow some of the more common operations, which may need to be done numerous times, to be performed at different stages of the image processing pipeline. By doing this staging of the processing, operations such as subbanding and superbanding can be optimized for different memory accesses and the resulting image bands reused by the GT 404.

For example, an image could be filtered to one half resolution using line buffering that stores eight lines of the input image and utilizes 128 pixels per line and the eight lines to produce a highly optimized one half resolution image. Such processing could be done in the input path or in IR 318, and the filtered one half resolution image could be available to the GT 404 as an image subband. To perform the equivalent downscaling operation in the geometric transform operation requires use of 1024 texture samples from the original image. If the GT 404 includes a memory buffer or texture sample cache, the accessing of the texture samples can be included as those same texture samples would typically be needed for the other geometric transform operations. In cases where the GT 404 has both the access to enough texture samples and the sufficient computational throughput to perform the complete operation including the scaling of the image, then the GT 404 would use the highest resolution image band for the texture samples. If, however, the geometric transform operation is limited in either the number of texture samples or the amount of computation, a superior image can be generated by using texture samples from both the highest resolution image subband and the other specially filtered and scaled image subbands. Even with the different staged processing, it is often necessary for the GT 404 to perform multiple passes in order to complete the desired operations.

Geometric Transformation 404 processes video in other 3D texture mapping modes too and may use systems that accommodate multiple textures in images. For example, Geometric Transformation 404 can use high quality texturing techniques such as bump mapping and displacement mapping which apply multiple texture maps to an image. These multiple texture map modes may use different subbands of the image data as texture sources as well. As another example, Geometric Transformation 404, to model the graininess inherent in photographic film, may apply multi-surface texturing to give video a more film-like appearance. Geometric Transformation 404 can allow a user to select the graininess modeling feature as part of the setup procedure, similar to selecting room effects such as "Hall," "Stadium," etc., in an audio playback option. Geometric transformation 404 can also correct for color amplitude disparities by using the light source techniques associated with different lighting models in a 3D system.

A "tessellation map" for characterizing the display distortion may be made up of non-uniform triangles having a denser mesh where the degree of distortion is higher.

Image modulators have a fixed number of pixels spaced uniformly in a pattern. Projecting an image from an image modulator to a display screen deforms the uniformity of pixel spacing. In other words, pixels are not correlated one-to-one from a sub-area of the image modulator to the corresponding sub-area of the display screen. Therefore, some screen display areas have more image modulator pixels than screen pixels while other screen display areas have fewer image modulator pixels than screen pixels.

The algorithm for determining the fitting of the tessellation map to the transfer function of the system can be based on a variety of techniques and can be tuned to the specific non-uniformities of the system. Additionally, since the Geometric Transformation 404 and texture mapping techniques are typically known at the time the tessellation mapping algorithm is decided on, any particular characteristics of those processing steps can be taken into consideration as part of determining the triangle mesh. Unlike interactive 3D games where the tessellation map changes every time the user moves, the tessellation map for this type of system can remain essentially constant as the projection path is not typically changing in real time. For applications that support location based entertainment systems or immersive 3D virtual reality systems, the projection path may indeed be adjusted in real time.

The tessellation mapping algorithm and resulting triangle mesh may be generated by a variety of techniques including generating various test inputs and capturing the test images to measure the transfer function of the system. Test inputs can include single pixel or single line images, different shapes projected onto different parts of the display screen, and also can vary the color components and color intensities. The ability to process real time video images may be bound by some combination of the number of triangle vertices, the amount of processing done for each vertex and the fill rate for the processing of the non-vertex pixels of each triangle. It is because of these various processing steps that having too many small triangles may not be practical. Having too few large triangles may not give good results either. So coming up with the technique that utilizes the smaller triangles where they are needed is an important step in the triangle tessellation.

While not typically considered, it is possible for a more sophisticated system to include real time image data in determining the triangle mesh and come up with a new dynamic tessellation technique. The advantage of such a dynamic tessellation technique is that the areas of the display that have the most activity and high frequency content can dynamically be allocated a finer triangle mesh whereas the areas of the display that have less activity and less high frequency content can dynamically be allocated a coarser set of triangles. The amount of high frequency activity in an area of the display may be determined by the Bit Stream Engine 3125 for a compressed data stream or by the Image Reconstruction 318 block. The determination can be based on different coarse quadrants of the display screen, moderate size tiles, smaller size precincts or all the way down to code blocks. The dynamic tessellation would then use the transfer information of the system along with the real time content information to determine how best to choose the triangle mesh for a given image or sequence of images. Additional information regarding the texture mapping techniques used in the system may also be used in choosing the triangle mesh.

Geometric Transformation 404 can process digital data from a multi-camera system to improve the focus, and thereby provide higher quality images for image modulator 244. Geometric Transformation 404 evaluates which of the multiple camera views provides the best focus for an object and then reconstructs the object in proper perspective. Geometric Transformation 404 then combines the multiple camera views on a regional or object basis to produce output images. Multiple camera views can also be used for multi-frame image reconstruction.

Geometric Transformation 404 can also use multi-camera bitstream information included in the image data to determine the object depth of a scene and to construct a 3D model of the shape and motion pattern of the moving objects. Geometric Transformation 404 then uses the same bitstream information to solve problems related to a curved screen 260 projection to achieve proper object motion completely across the screen 260.

Other motion information of incoming data streams such as the frame rate of the source video or frame rate of objects within the video stream may be utilized by Geometric Transformation 404 in generating output frames. When combined with MLC 420 controls and an appropriate modulated light source and image modulator, GT 404 may be used in matching the source frame rate of video and objects with the display frame rate. Various objects in incoming video sequences will have their own independent motion. The DOP 230 output will support one primary frame rate at a time. To accommodate the independent motions of different objects, motion compensated filtering may be used to position moving objects at the right location in an output field.

Geometric Transformation 404 can also improve stereoscopic 3D display systems in which multiple camera channels present a binocular display and each of a viewer's eyes sees a respective monocular view of a scene. The video input from multiple cameras, combined with knowledge of the position of the camera, enables generating a 3D display. The positional information is used during the display process so the viewer will see camera views from the proper right and left eye viewpoints. In a preferred embodiment, a base layer of video information is broadcast that does not include stereoscopic 3D information and can be decoded and displayed normally. A layered coding scheme is used to provide the supplemental stereoscopic 3D information. In another system, supplemental bitstream information provided in layered coding can explicitly indicate objects in the video, as well as the depth and motion of these objects. The GT 404 can use the positional camera information as well as explicit object information to transform the display output data. Geometric Transformation 404 can construct each of the monocular views in accordance with the focus and motion adaptive filtering techniques described above.

The techniques for matching viewer positional information and multiple camera views can be used for multiple screen entertainment systems. These entertainment systems may involve some combination of moving and stationary screens as well as moving or stationary viewers. One example application is a theme park ride where the viewer sees multiple screens while he is moved along the ride path. The ride path may be either pre-determined or interactively determined.

For multiple video input systems, the Geometric Transform module 404 can be used for performing special effects and real time transitions between video streams to improve the user interface. For example, when changing channels, instead of abruptly changing from one channel to another, the geometric transform module can fade one channel and blend it into the new channel. Fades and blends typically keep the video pixels at the current locations and perform weightings to increase or decrease the intensity of the pixel values. This is also used for menu overlay features such as on line program guides and user setup menus. The Geometric Transform module 404 can also perform more advanced transitions such as wipes or warps. These more advanced transitions involve warping the video image by changing the spatial coordinates of the video image. One technique for performing these effects is to use video as a texture map and to apply the video texture map in real time to the changing display map. When the image subbands are produced with higher quality than would be produced by using the GT to downscale the image along with the other processing required by the GT 404, making use of the image subbands improves the quality for the various geometric transforms.

Based on the projection system parameters the GT 404 performs the image transformations. The various processing stages of the GT 404 are able to use image subbands from the original image to process and create the new image output frames. In some cases, additional sampling techniques may be used on the output of the DIP 210 to produce the data for the DOP 230. Geometric transformation of digital images is a sampling process and is susceptible to aliasing artifacts. Simple sampling techniques such as point sampling are not sufficient to avoid aliasing. Instead, techniques such as area sampling, supersampling, adaptive supersampling, stochastic sampling, poisson sampling, jittered sampling, point diffusion sampling and adaptive stochastic sampling may be needed. Other more advanced convolution techniques are also used in sampling, and even after sophisticated sampling is used, post sample filtering is required. As with all well designed adaptive algorithms in this patent, special filtering is used to prevent artifacts that would result from sudden changes in algorithm within the same image or image sequence.

As part of the DOP 230 operations, it may be necessary for video frames to be combined with graphics frames where the graphics frames may be input to the system over one of the digital or network interfaces or the graphics frames may be internally generated by the DOP 230. In either case, the graphics frames will require pre-compensation processing to assure that the output image is properly displayed. This may either be done in conjunction with the video images or independently from the video images and then combined. In the simple case of combining the graphics and video, a masking or overlay operation may be performed where on each pixel basis either the video or the graphics information is displayed. A more sophisticated approach of overlaying the graphics with the video uses different levels of transparency. The technique of supersampling or multisampling, where each pixel is divided into subpixels, is used in generating the graphics images to implement anti-aliasing. Even in the case where the graphics image has been processed independently for anti-aliasing to avoid jagged edges, the combined effect of the graphics and video may still have undesirable visual artifacts where the graphics and video pixels meet. An improved method for combining the video and graphics frames is for the Geometric Transformation 404 to perform anti-aliasing which may be combined with texture transparency modes to improve the overall look of the combined video and graphics image. The function of the anti-aliasing techniques is to combine the video and graphics image data at the edges to produce a more natural look to the combined image.

Image modulator MLC 420 outputs may be analog but preferably are digital and include separate data and control signals for each R, G, and B color component which may be 6 bits, 8 bits or more. For TFT displays that include column drivers, MLC 420 outputs, for example, can be on one or two 24-bit digital busses, based on 8 bits per component, that drive a raster scan. Alternatively, MLC 420 may use voltage or frequency modulation techniques for outputs to drive image modulator 244. MLC 420 outputs, for a flat panel display, include row and column drivers, and for each active matrix TFT, passive matrix LCD display, or other display type that requires them, include voltage level specifications. Prior to modulating images, MLC 420 determines the simplest way, the frequency, and the values representing the data to be written to image modulator 244. MLC 420 uses TGP 412 and RSR 414, which include timing controls for image modulator 244 and the modulation controls to improve display quality.

MLC 420 preferably receives processed data over databus 450 and provides output data and controls to image modulator drivers 242 and image modulator 244 and to display light controls 255. The MLC 420 may include a Timing Controller (TCON) that performs the sequencing controls of the row and column drivers of the image modulator and display light controls 255 or an external TCON may be included in the system. In either case, the TCON may be used to prevent tearing within an image frame and to best portray motion. One of the techniques used by MLC 420 involves loading the image modulator 244 with frames or sub-frames of data during the "blanking interval" while the display light sources 270 are off, then once the image is loaded, the appropriate display light sources 270 are turned on. This is referred to as the shutter effect and in a color filtered system the entire multi-colored image may be loaded into the image modulator 244 during the blanking interval.

Figure 5:
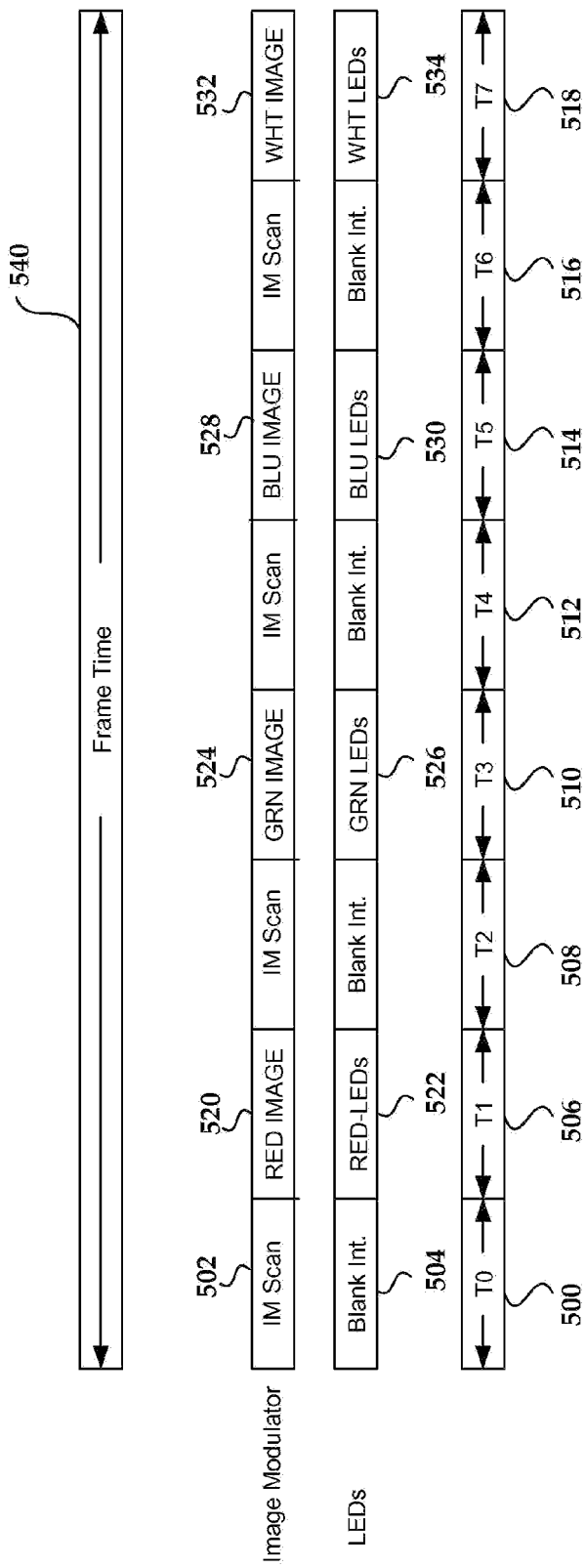
FIG. 5 depicts the time-based controls for an image modulator and for the different sequential color light sources.

FIG. 5 depicts the time-based controls for both an image modulator and the different field sequential color light sources. FIG. 5 is consistent with a preferred embodiment that utilizes field sequential colored display light sources 270 combined with a single image modulator 244. The image modulator 244 has a resolution of a single frame of display data. Unlike an image modulator 244 that includes a color filter, an image modulator 244 that uses field sequential colors does not require a three times (RGB) or higher (RGBX) spatial resolution. Since the light sources provide the pixel colors a color filter is not required for such a system. This saves not only the cost of the color filter but also eliminates the light attenuation that color filtering typically causes.

The colored light sources are considered to be distributed across the display surface such that consistent intensity can be achieved for each sequential color field. A variety of techniques are used to assure the consistency both for intensity and for wavelength including compensation techniques discussed elsewhere herein. For each color and for each LED, individual controls may be included so that the intensity for the corresponding portion of the display can be varied to produce a higher dynamic range across each color field. The LED color sequence in this example is Red, Green, Blue and White though other color sequences are possible. The white color field may be produced by utilizing all of the red, green and blue LEDs at once, or White LED may be included as one of the display light sources 270.

In FIG. 5 the eight time periods T0 through T7 are labeled as 500, 506, 508, 510, 512, 514, 516 and 518 and collectively make up the Frame Time 540. A frame time 540 is considered the full time to sequentially display each of the color components of a full display frame. Though shown as equal, the time periods are not required to be equal. In particular, the speed of image modulator 244 scanning 502 via the image modulator drivers 242 will dictate the "blanking interval" 504 needed between color transitions. The blanking interval 504 creates an effect similar to a shutter where a complete image can be loaded into the image modulator 244 with the illumination off. The frame time 540 is inversely proportional to the refresh rate of the display. The length of time for each of the colors will typically be the same though the overall color value could be determined by the time period for the individual color fields. In another more advanced control system the frame time 540 may be varied to perform motion matching of the incoming video or object frames to the output frame rate.

At T0 500, none of the LEDs are illuminated and the red image 520 is loaded into image modulator 244. At T1 506, with the red image 520 completely loaded, the red LEDs 522 are illuminated. The intensity for the different red LEDs 522 may vary based on the desired light levels for the corresponding position of the display. At time T2 508, the red LEDs are turned off and the image modulator is reloaded as quickly as possible with the green image 524. Once the green image is loaded, at T3 510, the green LEDs 526 are illuminated and the green image 524 is displayed. At T4 512, the green LEDs 526 are turned off and the blue image 528 is loaded into the image modulator 244. Once the blue image is loaded, the blue LEDs 530 are illuminated for duration T5 514. At T6 516 the blue LEDs 530 are turned off and a final white image 532 is loaded into the image modulator 244 which is then at time T7 518 illuminated with the white LEDs 534. Having a separate white image is not typically necessary though may be useful for enhanced brightness displays. The actual white LEDs may be separate LEDs from the red, green and blue LEDs or may be the composite of all three colored LEDs.

In the FIG. 5 example system, all of the LEDs for a given color field are cycled at once. In the traditional color filtered systems only one blanking interval is needed to load the entire image. In the field sequential color system, four blanking intervals may be required as four color field images need to be loaded into the image modulator. Each display frame is typically one fourth the spatial resolution of the full four color fields where the effective resolution is temporally enhanced with the more frequent updates.

Figure 6:
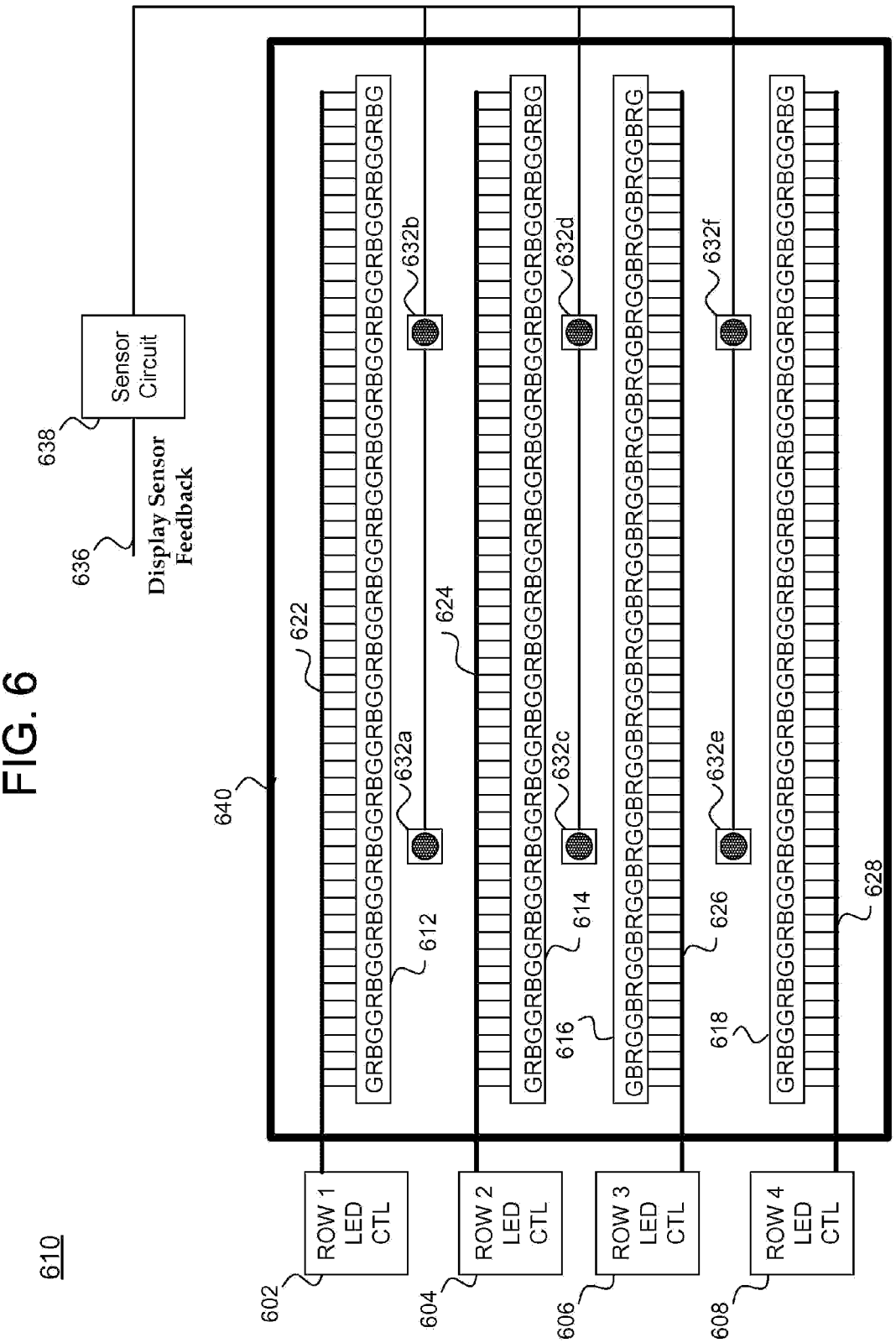
FIG. 6 is a block diagram of an LED based backlight system for a Flat Panel Display including light sensors for feedback.

FIG. 6 shows a configuration for another preferred embodiment where all of the LEDs for a given color field do not need to be cycled at once. This embodiment can be used with a rolling shutter technique for either a traditional color filtered system or a field sequential color system. A hybrid system that includes multi-color LEDs and color filters may also be embodied with or without any shutter technique.

FIG. 6 shows in block diagram form a three color LED back light system 640 for a flat panel display. System 640 shows four rows of LEDs 612-618 with individual LEDs having controls via respective buses 622-628. Though shown in rows for simplification of the illustration, a preferred embodiment of this invention would arrange the LEDs in a staggered pattern or in a hexagonal, octagonal or other polygonal grid in order to improve the light patterns produced by the LEDs. The grid points could be either individual LEDs or clusters of the multicolored LEDs that make up each pixel. Side emitting LEDs or LEDs with a diverter may be used to prevent undesirable color spots on the screen. The sensor placement would vary based on the specific placement of the LEDs, but the general concept for achieving the sensor feedback and LED processing remains the same. In the case of a polygon LED configuration, the sensors could be centered within each polygon. While this configuration includes only red, green and blue LEDs, another configuration may also include white LEDs or another color. In general, the colored LEDs can be combined to produce white either temporally during sequential color intervals or spatially utilizing adjacent pixels.

In a preferred embodiment, the brightness of each LED is individually controlled via the row LED controls 602-608 over individual control lines which make up the busses 622, 624, 626 and 628. Other systems may control the LEDs in either groups or clusters based on some combination of location and color. Row 1-4 LED controls 602-608 receive commands from MLC 420 and, depending on the type of LED, the brightness control may be based on varying voltage, current, pulse width modulation or some combination of the three. While FIG. 6 shows a repeated sequence of green (G), blue (B) red (R), green (G), different patterns and different colors may be used where the objective is the ability to display a full color gamut. In this example, since current green LED technology does not achieve as high an output as red and blue, the number of green LEDs is doubled. In another system, a fourth color (wavelength) LED would be used instead of a second green LED.

As indicated with FIG. 6, when the image modulator, such as a TFT panel, is in position over the lighting system, a large number of image modulator pixels are affected by each LED and each modulator pixel may be affected by several LEDs. The relationship between the LEDs, the modulator pixels and the display screen may be described by a Point Spread Function (PSF). There will typically be some type of diffusion film between the LEDs and the image modulator to reduce the potential for bright spots from the LEDs as well as to even out the light source overall. The LEDs would typically be mounted onto a Printed Circuit Board (PCB) and there would be some type of reflective material placed on the LED side of the PCB to help harness and direct the LED light towards the panel. The row 1 control 602, row 2 control 604, row 3 control 606, row 4 control 608 and the sensor circuit 638 need to be physically out of the way of the light path from the LEDs to the TFT panel and could be located on the back of the PCB or under the bezel of the display.

Included as part of LED back light system 640 are a variety of sensors 632a-632f. The sensors may include detection for brightness and for wavelength. The sensors may be positioned at various locations within the display and may either detect the LED light directly, or through a diffusion filter that is part of the flat panel display. In one embodiment of this invention, each LED may include a sensor either externally, as part of the LED packaging, or as part of the LED fabrication. The sensors may require sampling and conversion circuitry that may either be integrated into the sensor or may be a separate circuit, such as sensor circuit 638. The display sensor feedback path 636 is used to feed back the sensor data to the sensor input 426 which is part of DOP 230.

The sensor feedback information is processed to determine the characteristics of the various LED light sources with respect to brightness and color (wavelength) and further processing calibrates the display. The LED characteristics may change with temperature as the electronics heat up and as the LEDs age which changes the PSF. Another important aspect of light sources is to maintain the proper white balance of the system where the various wavelength LEDs are in balance with respect to the desired color temperature. The processing circuitry for the sensors may be shared where multiple sensors would share the circuitry over time. For example, the sensors may output an analog signal and the circuitry would perform analog to digital conversion. Even in the case where there was a sensor for each LED, the circuit would be shared for the analog to digital conversion. It would not typically be necessary to calibrate all of the LEDs simultaneously, though it may be convenient to have several sets of sensor circuitry so that the sensor information from more than one location could be used to determine the LED characteristics for a given set of inputs.

As in FIG. 6, when the sensors are placed at various locations within the display, but there is not one sensor per LED, it becomes more difficult to determine the characteristics for any given LED. Other systems such as OLED and NED based systems, where the light source is included as part of each pixel component, may also include a sensor for each pixel component. The sensors for each pixel component may include just the sensing element where the conversion and sampling from the sensing element to usable data (such as analog to digital conversion) may be performed in one or more sensor control circuits that are shared between the pixel component elements. The discussion below is focused on the LEDs, but could easily be applied to OLED, FED, NED or other light sources.

Two methods for characterizing LEDs are through a diagnostic mode and through run-time sampling where actual display data is being displayed. In a diagnostic mode, all of the LEDs could be turned off except the LED-under-test. The LED-under-test could be sequenced through its different levels and the sensor would record the values at each level. For example, if an LED had 16 brightness levels, the LED would be set to brightness level 1 and the sensors in range of the LED would record the color and intensity levels. The brightness level would then be changed to 2 and the LED would record the color and intensity levels for level 2. This process would be completed through all 16 brightness levels and a response table for the LED could be stored. The procedure would than be repeated for each LED in the system. Combined with the information on the relative positions of the LEDs and the sensors, a complete calibration of the flat panel lighting system can be performed in this way. Some systems may include a temperature sensor to further calibrate the display based on the temperature. Other systems may also include sensors for measuring ambient light conditions that can affect the display appearance.

While at the factory or during maintenance of the display, a diagnostic mode is possible. However, in normal operating conditions, such as in the application of a consumer television, it is not always possible to perform such a diagnostic operation. For a consumer application such as a television system, such a diagnostic mode could be hidden in the operation of the television. For example, if a television is on for more than an hour, the LEDs are presumably operating at normal operating temperature. When the consumer turns off the television, the LED diagnostic mode could be performed. With the TFT or LCD screen turned off, such an LED diagnostic mode could be run with minimal annoyance to the consumer and unless the room was darkened, the consumer may not even know such a calibration took place.

However, in some applications, a digital display may seldom, if ever, be turned off and it would not be possible to perform such a diagnostic mode in normal operating conditions. For example, if the display is part of kiosk in a hotel or airport it may be left on for months or years. In such a case, it becomes necessary to perform the LED characterization using the operating stimulus that is part of the display operation. The MLC 420 circuit knows what outputs are being driven to the display light controls 602-608, and can track and compare the driven outputs and the corresponding sensor data. Such a feedback system, where the sensors record the light and color and correlate it back to what the LEDs were set to, could be operated regardless of LED output settings. Alternatively, the system could detect predetermined LED conditions that would occur naturally during display operations and only record the sensor data at those times. Some applications, such as a kiosk that continuously shows a schedule of flights at an airport, would only have a limited set of colors displayed so a chosen predetermined LED condition may never be met. Therefore, a system that utilized a technique for detecting pre-determined LED conditions may also need a mode for recording sensor readings for whatever the LED settings happen to be.

The DOP 230 makes use of processed sensor data as part of the various block functions including DM 402, SGP 408, TGP 412 and MLC 420. In one embodiment of the current invention, the sensor data can be used to adjust or override the DM 402 information that is stored for each pixel. The SGP 408, TGP 412 and MLC 420 would then utilize the updated DM 402 pixel information with regard to color and intensity to adjust both the display modulation controls as well as the light source controls. In another embodiment, the sensor information would be stored in the memory 424 and each processing block would utilize the information while performing the various processing steps. In both cases, the spatial and temporal characteristics of the LEDs and the image modulator are utilized by the SGP 408 and TGP 412 processing units such that the MLC 420 is able to drive the appropriate values to the LEDs and the image modulator array. The MLC 420 may use the combination of LEDs to alter the wavelength for combined light. Additionally, the combination of processing the image content and driving the image modulator and LEDs can be used to produce a higher quality display output. In a preferred embodiment of this invention, the expanded dynamic range enabled by controlling the LEDs is utilized to achieve a higher quality image than what would otherwise be possible with a single light source and image modulator.

The processing for the LED control is performed spatially and temporally. Spatial processing is performed both for the LED array and for the image modulator pixels based on the incoming display data and the other display characteristics. There are several ways to perform the spatial processing for the LED PSF. One method is to filter the display image down to the approximate resolution of the LEDs and use that as a basis for determining the LED brightness levels. Similar to wavelet decomposition where an image is filtered to a lower resolution, the image can be filtered with a variety of filtering algorithms. Though the LED array of FIG. 6 could be considered to have a resolution of 60 horizontally and 4 vertically, the spacing of the rows and the overall PSF need to considered as part of the filter design. Additionally, in order to achieve the required brightness for the brightest pixel, the LEDs that affect that pixel may be required to be lit at a higher level than an average weighting filter would otherwise conclude. Sophisticated filtering techniques may be used to determine the best LED values.

For example, the modulator image can be filtered from an original display resolution of 1920×1280 to a 60×4 representation of the image that matches the resolution of the LEDs. The LED colors could be considered prior to the filtering, during the filtering or extracted after the filtering. The filter coefficients can be used to approximate the relative influence that the LEDs have on the image modulator with a particular weighting to the pixel values that require the highest brightness. There is no point in using the values from image modulator positions to determine an LED value if that image modulator position is not effected by the light from that LED so the cutoff for the filter range may be very sharp. In a simplified filter design, the region of pixels effected by an LED or group of LEDs is scanned and, based on the highest values for red, green and blue for those pixels, the brightness levels for the red, green and blue LEDs are set accordingly. Other types filtering techniques may be used and may start from the original image data or from a filtered subband of image data.

Note that in one type of system, only once the LED values for a given region of the display are determined can all of the image modulator values for the pixels in those regions be determined. An image processing system may choose to do the full screen analysis on the image frame data, determine the LED brightness settings and then determine the image modulator data values or perform the processing on a region by region basis. Temporal processing can be included in these steps as the data from the prior frame is available in a memory buffer and can be used to calculate the LED brightness settings and the image modulator data values. Performing the full screen analysis will add a frame of latency to the system. For many types of television and other systems, this frame of latency is not problematic. Systems that seek to perform multi-frame temporal gamma correction may add an additional frame of latency such that performing the full screen spatial processing is not an issue. However, for display systems with more interactive requirements, such as some computer applications or game machines, adding a full screen of latency may not be acceptable.

For such latency sensitive applications, instead of performing full screen analysis, the analysis could be done based on a limited number of rows, referred to as a slice. Row based processing is used because of the scan line nature of video and displays. Considering the LED configuration of FIG. 6 where there are four rows of LEDs, since the first row of LEDs would typically not effect pixels that are not in the top one-third of the display, the analysis for determining the LED brightness values for the top row could be performed from the slice of data values from the top one-third of the screen. The light box for the LED system may be designed with horizontal light blocking structures such that no light from one band affects the image modulator pixels in another band. A system with four rows of LEDs would have four horizontally banded light boxes that are only affected by that one row of LEDs.

LEDs or clusters of LEDs arranged in staggered rows or hexagonal patterns would similarly affect the rows of display data based on the spatial distribution of the light sources relative to the display pixels. Once those LED values had been calculated, the LEDs could be ramped up or down to the appropriate level when the pixel modulator values were being scanned out to the image modulator. Display slices corresponding to LED rows 2, 3 and 4 could be performed in a similar manner and pipelined such that the overall latency added to the system was a fraction of a frame, not a full frame. A more aggressive approach could determine the LED values based on even less of the display data rows and could lower the latency further though the best values for the LED and pixel modulator may be slightly compromised.

In a first embodiment, the LED configuration of FIG. 6 is combined with an image modulator 244 that includes a color filter. The image modulator typically has one independently controlled sub pixel for each color such that a display with 1600 columns of pixel triads (R, G, B) has 4800 actual pixel sites that are controlled by the DOP 230 and image modulator drivers 242. Since the image modulator includes color filters, a white light source is all that is required. The white light may be provided by white LEDs, by colored LEDs or some combination where changes in the light color can be used to affect the color temperature. In a more sophisticated system, the image data can be used to control the LEDs to affect the pixel colors for the display image either across the entire image or on a sub image basis. The individual rows of LEDs may be controlled all at once or sequenced from top to bottom matching the display information scanned via the image modulator drivers 242 into image modulator 244 also top to bottom.

The LEDs may operate in a "constant on" mode which does not turn the LEDs off while scanning new frames into the image modulator 244. Alternatively, a shutter mode may be included which turns all of the LEDs off during the scanning in of new image modulator display information and only turns the LEDs on when complete frames are available. This technique is sometimes called "flashing" or "strobing" the display. To achieve adequate brightness, the scanning in of the image modulator needs to be relatively fast so that the "duty cycle" during which LEDs are on is a large percentage of the frame time. The multiple (four) rows of LEDs allows a "rolling shutter" mode where the different horizontal bands of the display can be cycled to be off during the scanning of the corresponding band and flashed on during period of steady state. Depending on the speed of the scanning and the other display characteristics, the appropriate technique of controlling the LEDs and scanning the image modulator is used.

A second embodiment where the image modulator 244 does not include a color filter uses the LED configuration of FIG. 6 in a field sequential color mode. The effective display image is determined by the three (R, G, B) sequential color image fields. The resolution of the image modulator, since it only needs to support one color at a time, is typically one third that of the equivalent color filtered image modulator. Similarly, the number of pixels required to be scanned into the image modulator for each color is one third of the total. Depending on the speed and configuration of both the image modulator 244 and the image modulator drivers 242, the time to scan in each color field image may or may not be lower than scanning the complete image. Temporal Gamma Processing across the color fields may be used to achieve more accurate and higher scanning rates. The timing of the color fields within a frame and between frames may be varied along with the flashing intervals to avoid color break-up problems. Additionally, the frame rates of incoming video and motion of objects within video sequences may be used to influence the field, frame and blanking timings.

Referring back to the FIG. 5 illustration of the time-based controls for both an image modulator and the different colored LEDs, the image scanning time 502 is an important consideration as it affects the blanking interval 504 required and thus the duty cycle and ultimately the brightness of the display. The four row LED configuration of FIG. 6 may allow the different bands to each be sequenced separately and produce a rolling shutter for each color field. Assuming the same scanning speed for a full shutter and a rolling shutter, a rolling shutter may reduce the blanking interval for each band to approximately 25% (one fourth) of the full shutter interval.

The reduced blanking interval for each band increases the duty cycle of the LED "On" time for each color and improves the brightness of the display—or allows use of lower cost less bright LEDs. Using more bands further improves the duty cycle advantage of a rolling shutter. Using dividers between the bands, so that no light leaks from one band to another, improves the ability to tightly control the timing of a rolling shutter for the different bands.

In a preferred embodiment of the invention, the multicolor LED based backlight system can dynamically vary the times for different color fields and can vary the wavelengths for the color fields themselves. Depending on the source of the image data, the data may be 24 frames per second for celluloid film based content or closer to 30 frames per second for video that was not originally celluloid film based content. Most modern non-celluloid cameras operate at NTSC, PAL, MPEG, DVI or another format that is higher frame rate than the historic celluloid film's 24 frames per second. The multicolored LED based backlight system can match the display field timing to be a multiple of the source fields. For example, a 24 frame per second movie may be processed as 72 sequential color fields per second in a repeating pattern of R, G and B fields each shown 24 times per second. Another system may double or triple the color field rate such that the same R, G and B color fields are shown two or three times each at 48 or 72 times per second each for a total of 144 or 216 fields per second. This allows for a type of frame rate matching that can achieve outstanding smoothness of content display motion without the complexity of performing motion compensated frame rate conversion.

Performing motion compensation on moving objects within a video stream may be useful for reducing some of the "rainbow effects" or "color breakup." The color breakup is a result of the focus of the field sequential colors being shifted on the viewer's retina. To prevent this effect, a preferred embodiment of the invention tracks the position of objects from one frame to the next. Then the fields that make up each frame utilize motion compensated object tracking to produce each sequential field with the various objects at the correct location for the timing of the field being displayed. For field sequential color displays, this motion compensated object tracking allows the color fields to be focused on the same point of the viewer's retina so no color breakup occurs. For field sequential displays that do not strictly separate the fields by color, the motion compensated tracking can improve the motion portrayal and perceived detail for objects that are in motion. Note that since various objects in the video stream will move at independent rates, motion compensation is required to correlate all of the objects within a single output field.

Other sequences of content may lend themselves to varying the wavelength for each sequential field. Beyond just assuring proper color balance, color temperature and color calibration, the color gamut may be enhanced by utilizing more than one LED during sequential color fields. Using techniques such as Pulse Width Modulation (PWM), the brightness of each LED can be smoothly varied from one color field to the next or adjusted within a field time. Instead of delineating the sequential fields by color, another preferred embodiment uses sequential fields are used that utilize a mix of LED colors within a field. The sequence of fields may further be optimized by varying the display time for each field where the various LEDs may be adjusted between fields or within a field. For example, the wavelet decomposition frames could be used as successive field data where the more significant frames are more temporally heavily weighted and shown for a longer percentage of the frame time. One advantage of such a technique is that the LED lighting may not need to be shuttered between fields as the different fields will not vary as much as with a field sequential color system. In addition to the display light sources 270 that are modulated as part of the display, additional light sources may be controlled by DOP 230 that effect the ambient lighting around the display. Ambient lighting affects how the viewer perceives the display image and can enhance the overall viewing experience. Viewers can experience eye strain due to the normal brightness changes that happen from scene to scene. The same physiological effects that cause eye strain can also diminish the eye's ability to perceive image detail and dynamic range. A lack of ambient light may make the viewer more susceptible to rainbow and color break up effects that are particularly prevalent in field sequential color displays. In order to combat these effects, display system 240 may produce ambient light where the ambient light may be single colored or multicolored and may vary in color for different areas around the display. One embodiment uses the display light sources 270 in the ambient light generation and another embodiment uses dedicated ambient light sources (not shown).

Rather than being loosely spaced as in the configuration of FIG. 6, a multicolored lighting system for a projection television system will be more tightly packed together. A tightly packed array of LEDs can be better combined with a lens system to focus the light through the image modulator. Historically, a field sequential color system for a projection display was based on a color wheel that had a fixed rotational speed with fixed colors where each color may have rotated one or more times per frame time. A preferred embodiment of the invention for projection systems supports an LED lighting system with the added flexibility where each sequential color field can be any combination of colors and the duration for each color field can be varied. As with the LED based backlight system example above, frame rate matching can be performed to accurately match the content frame rate with the display frame rate. If appropriate, color wavelength enhancement between color fields may be used for improved color processing.

Figure 7:
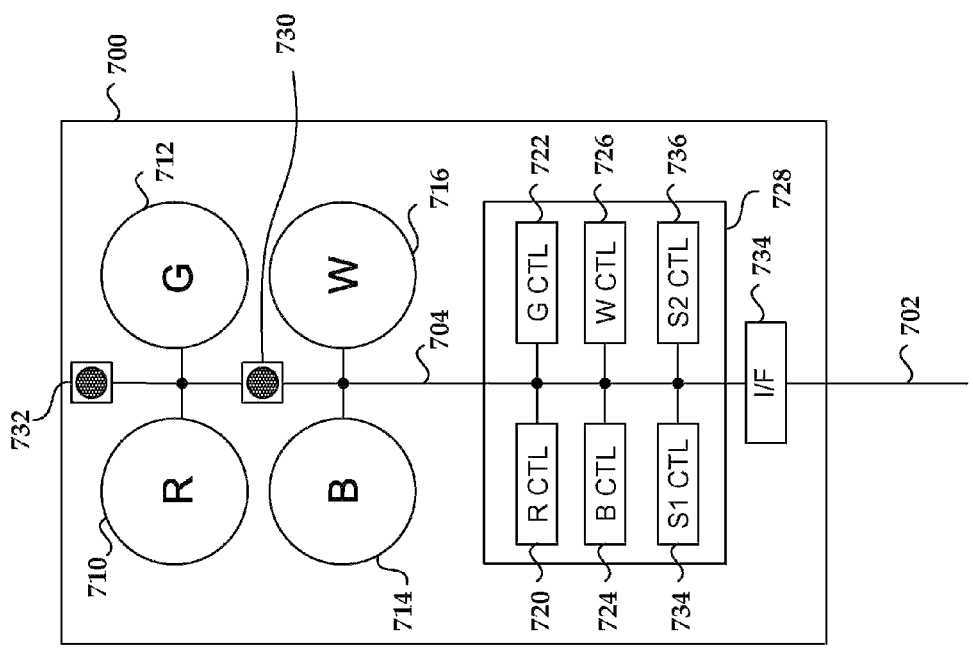
FIG. 7 is a block diagram of a Quad-Light source module including LEDs, a sensor, and integrated compensation and control circuits.

FIG. 7 shows a preferred embodiment of a multi-colored LED light source implemented as module 700. The module may be fabricated as multiple components then assembled into housing such as a ceramic or plastic carrier giving careful attention to heat dissipation and other environmental factors. Depending on the system configuration, a lens or diffusion layer may be used over the module. The various components may be electrically connected via bond wire, chip on board, bumped assembly or other packaging and connection techniques. The modules may be spaced and positioned behind a direct view flat panel display with the modules arranged so that the image modulator pixels affected are determined by their distance from the modulator or a light box may be constructed so that each module specifically affects a certain rectangle of image modulator pixels. To create more even brightness across the light box, various diffusion filters may be applied. When used for a projection television light source, modules will be more closely arranged where each module has a focusing lens to direct the light for a group of microdisplay modulator pixels.

Choosing the LEDs for a given module can be done by picking particular combinations of LEDs that have been binned according to wavelength. At time of manufacture, not all blues LEDs have the same wavelength; nor do all green or red LEDs. The combining of binned LEDs may allow for more control of the white balance for a particular module. A similar binning would typically be done for the system of FIG. 6. White LEDs have a similar problem of varying phosphor and wavelength and also typically need to be binned.

The module 700 shown consists of red 710, green 712, blue 714 and white 716 LEDs though other configurations without white 716, with repeated colors or with non-primary colors are also possible. Also shown in the module are a light sensor 730 and a temperature sensor 732 also known as thermistor 732 which may require local processing blocks S1 CTL 734 and S2 CTL 736. There are color control blocks 728 associated with each LED: red control 720, green control 722, blue control 724 and white control 726. The color control blocks 728 may include non-volatile memory (not shown) that is either analog or digitally based and may be shared between blocks or kept separate. The control blocks 728 may perform various calibration and compensation steps and may perform adaptive dynamic gamma correction.

The various components communicate over one or more bus structures 704 and through interface 734 are able to interface with the external control bus 702. The LED drivers circuitry may be integrated into the color control blocks 728, may be external as part of display light controls 255 or may be staged to include circuits in both. Depending on the integration of the LED driver's circuitry, external control bus 702 may directly connect to the MLC 420, another control block within DOP 230, one of the Display Light Controls 255 blocks or a new lighting modules control block (not shown) may be designed to control all of the modules 700.

The non-volatile memory in the color control block 728 may include various table lookups such as a gamma table for adjusting the values for each LED. Interface 734 and bus 702 may allow the sensors 730 and 732 to be interfaced to other system components. This may be done after the S1 CTL 734 and S2 CTL 736 blocks have processed the raw sensor information, or the raw data sensor data may be processed external to the module. The sensor information may be processed both within the module 700 and by external processing hardware and the processed data may be made available to different control blocks in the system.

As described with reference to DM 402, gamma adjustments for changes in ambient light conditions, temperature conditions, LED characteristics due to manufacturing or aging or user settings may all dynamically affect the desired LED outputs. Changes driven by user settings or application software may be easily incorporated by DM 402. User driven changes may also affect the gamma tables. For example, the user may select different color temperatures, may adjust the hue, saturation, brightness, contrast or color or may have preset modes such as "Movie," "Cartoon" or other similar content related modes. Real time environmental changes such as the ambient light, temperature and LED characteristics may take time to be read back from various sensors and incorporated by DM 402. Use of serial busses and shared sensor input processing circuits may limit the response time of adaptive dynamic changes performed by a centralized controller. In a preferred embodiment, the real time environmental changes may be processed locally and any necessary adjustments to the LED values may be performed within module 700.

Examples for dynamic feedback compensation include adjusting each LED based on changes in ambient temperature or adjusting the brightness of each LED based on changes to the ambient lighting. Other adjustments may be across color control blocks, not just within one color such as if light sensor 730 detects that the wavelength value for the white LED has shifted such that to maintain the proper color temperature additional blue light is needed. The color control blocks for both the white and the blue lights are therefore required to compensate for such a condition. Color calibration is another adaptive and dynamic sensor based function that may be performed within each module 700. Varying levels of sophistication may be used to track and perform the compensation from simple offsets to full gamma tables.

Figure 8:
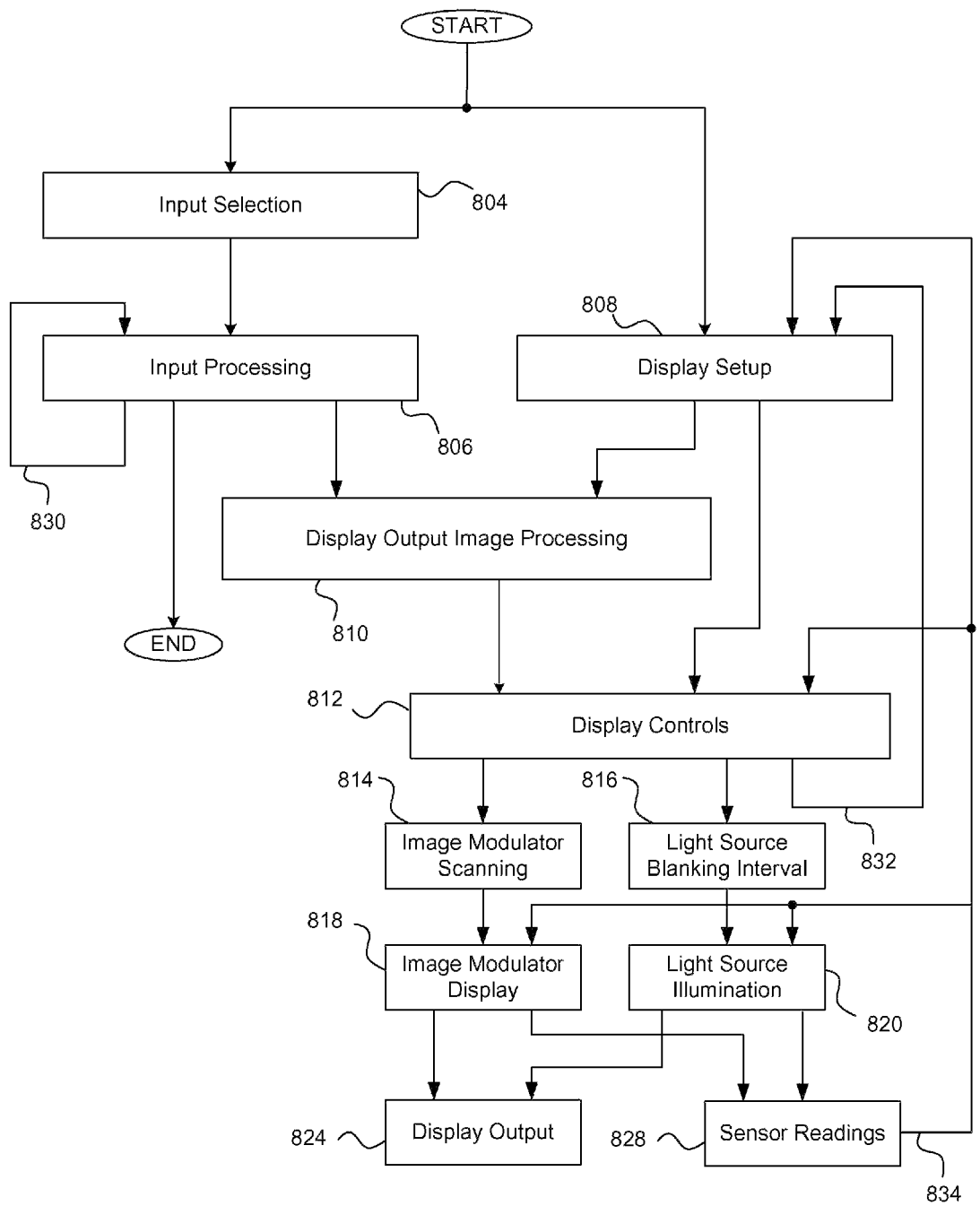
FIG. 8 is a flowchart of steps in a method of processing images in accordance with one embodiment of the invention.

FIG. 8 is a flowchart illustrating the display path from the input through the image modulation and light source sequencing to the display output for one embodiment of the apparatus. Also shown is the display configuration path including the initial display setup as well as the feedback paths for adjusting the configuration. Display setup step 808 utilizes the design and test of the display, the user settings and the feedback from the sensors to characterize the display. Portions of the characterized data may be stored in non-volatile memory, such as flash memory, to be available to the DOP 230 processing. The non-volatile memory may be part of any number of sensor and control subsystems associated with the image modulator 244 and display light sources 270. Each individual control system or the Display Map 402 (FIG. 4) processing block may coordinate the updating of the gamma tables and compensation values where appropriate. Some aspects of the characterization data are more temporary and stored in temporary memory which may be combined with the contents of the flash memory. As shown in FIG. 8, display setup step 808 receives feedback from both the sensor readings step 828 and the display controls step 812. By knowing both the display control outputs and the sensor readings, step 808 can correlate the real time response of brightness and wavelength for the LEDs. Other sensor readings are fed back to other functional blocks where compensation is performed locally as part of image modulator display step 818 and light source illumination step 820.

The steps for each video frame are described from start to output first with respect to the DIP 210 and DOP 230 processing modules, though the individual functions could be performed by other CPUs, DSPs, GPUs or other combined configurations. In step 804, DIP 210, where applicable, preferably selects the desired video inputs. Typically based on the user selection of an input, a microcontroller selects one or more input connections and determines the desired display mode. In step 806, the video input control associated with the connection exercises the Analog Input Control 302, Digital Input Control 304, and Compressed Input Control 312. Analog Input Control 302 converts the signal to the digital domain for further processing by modules 304, 312 and 318, and thereby recovers and enhances, the input images. Each processing module 304, 312, and 318 may preferably format the images and store the intermediate results in memory 308.

In step 806, Input Processing via Digital Input Control and Synchronization Engine 3040 performs the steps necessary to electrically receive an uncompressed input video stream. If the input stream is protected through encryption, as may be the case with an HDMI input, a decryption step is required. Compressed Input Control 312, via Bitstream Engine 3125, analyzes the compressed input streams and selects one or more picture streams for analysis and processing. For quality picture display, Bitstream Engine 3125 records the motion information and frame rate information from the bitstream for use by Image Reconstruction 318. Decompression Engine 3120 preferably uses MPEG-2, MPEG-4 or another decompression step to convert the compressed bitstream into a decompressed and decoded picture. Decompression Engine 3120 can simultaneously decompress more than one compressed picture stream for multiple picture displays including advanced picture-in-picture displays and multi-camera systems. For input data that includes layered coding information, where there is a base layer and an enhancement layer of coded information, Decompression Engine 3120 can decode both layers for use by the Image Reconstruction 318. In the case of a bitstream that has been encoded using image subbands, Bitstream Engine 3125 and decompression engine 3120 maintain the subband information while also providing fully decoded image frames.

Image Reconstruction 318, as part of the input processing step 806, spatially and temporally filters each image frame to reconstruct images. Spatial filtering includes various techniques for noise reduction so that the filtered image does not include artifacts that were not part of the original image. Filtering is preferably applied across the entire input image based on the data values. However, filtering can use additional information, such as spatial position of the decoded macroblocks that are provided by the Bitstream Engine 3125 in cases where, for example, the MPEG data has been decompressed by Decompression Engine 3120. This positional information allows the filter to reduce or eliminate artifacts at boundary edges from the decoded macroblocks while performing the more traditional spatial filtering on the other portions of the image. Other information from the Bitstream Engine 3125, such as the error terms for the macroblocks, indicates how much quantization took place for each block. The IR 318 enhancement steps can utilize this information for noise reduction filtering and any color enhancement processing. Enhancement processing may include expanding the color gamut and the dynamic range of an input image as well as increasing the resolution where appropriate.

Also in step 806, Image Reconstruction 318 performs enhancement filtering that uses information from the Bitstream Engine 3125 and can enhance input image details without amplifying the compression artifacts. Image Reconstruction 318 also performs temporal analysis, which utilizes multiple scenes to filter the images and to record the object motion information, then performs a super-resolution multiframe reconstruction. For each type of input data, super-resolution multiframe reconstruction can be used to create an image superband with higher resolution than the base input image where the created resolution is typically two times the original. This superband of image data can be created from either compressed or uncompressed input data and is used along with the image subband data for providing multi-resolution image mapping capability. Additional layered coding information is also used in step 806 such as stereoscopic 3D information in the form of anaglyphic 3D data.

The various image subbands and image superband that have been reconstructed for the highest quality representation are formatted and made available for the DOP 230. Even though the original input images may not have included high dynamic range content or full resolution content, the DIP 210 can enhance the input to create this information. The processing of recovering and enhancing new input images continues via path 830 until the system mode is changed or stopped. If the system is turned off, the input processing step 806 proceeds to the END. While in operating mode, the outputs from the operation of the DIP 210 are provided to the DOP 230.

In step 810, DOP 230 utilizes the DIP 210 output along with the display map 402 information from step 808 to perform Display Output Image Processing. For a projection system, step 810 performs geometric transformation of GT 404. Geometric transformation can improve display deficiencies related to the display environment, such as may be introduced by FIG. 1B light source 102, light source optics 108, microdisplay image modulator 110 and/or display system optics 112. Geometric transformation can also produce enhanced output images that correct for special environments such as non-uniform light sources, head-mounted, panoramic, and stereoscopic display systems. The spatial filtering techniques of GT 404 can use traditional real-time 3D graphics techniques such as texture mapping and anisotropic filtering to achieve the desired image manipulations.

Step 810 also utilizes processing blocks SGP 408 and TGP 412 to perform the display output image processing for both the image modulator 110 and 130 as well as for the light source 102 and 122. SGP 408 utilizes the input processed display frames from input processing step 806, combined with the processed display setup step 808 to process each incoming pixel to produce the enhanced output for that pixel as well as to determine the appropriate light source contribution for that pixel value. Since a display output pixel typically considers the triad (red, green, blue) or other combination of color components, each color component for each pixel may be referred to as a sub-pixel. SGP 408 and TGP 412 may process the various pixels and subpixels based on the color filter scheme used by the image modulator 244 and display light sources 270 and or based on the use of field sequential color processing.

In the case of an LED backlight system with fewer LED light sources than modulator pixels, the SGP 408 produces both the individually enhanced modulator values as well as the LED values based on multiple modulator pixels. TGP 412 combines with the SGP 408 processing to not only look spatially within a frame for the appropriate enhancements, but to also look across more than one frame to temporally enhance the image processing. A coordinated approach of SGP 408 and TGP 412 to process multiple frames allows the values for the light sources and image modulator pixels to be ideally determined such that outstanding image quality for moving images can be achieved. The combined processing also performs temporal processing across multiple color fields for field sequential color systems.

When input processing step 806 is able to supply processed images with enhanced resolution or enhanced dynamic range, in step 810 SGP 408 can perform the necessary display output image processing to produce a further enhanced output. Utilizing the human eyes characteristic perceptions to high dynamic range content, SGP 408 may utilize the input data to further process and produce enhanced brightness values of the light sources and modified values for the image modulator pixels. The DIP 210 may also provide a subband of the input image which is at a lower resolution than the main image but at higher resolution than the number of light sources, where the subband is further filtered and processed by SGP 408 to produce the desired light source values for each frame. The desired light source values of multiple frames are utilized by TGP 412 to further enhance the real time response of the overall display.

Input processing step 806 may determine the input frame rate of the source video content or for various frames based on object motion. Where appropriate, DOP 230 in step 810 may produce output frames that are matched to the underlying frame rate of the input frames. For example, film based content may be output at the native 24 frames per second while video based content may be output at closer to 30 frames per second. Other high frame rate outputs are also possible including frame rate converted output that was either generated at the source, generated with the use of a layered coding scheme, or frames that were generated by DOP 230 performing motion compensated frame rate conversion.

For stereoscopic 3D input data, DOP 230 may combine the two image views into a single display output for systems that use a single display and external anaglyphic or shutter based glasses to reveal the 3D effects. For systems that include dual displays for stereoscopic 3D, such as head mounted displays with a display screen per eye or systems based on polarized viewing paths to two screens, DOP 230 may process each image and output it independently to the corresponding display.

The output of the SGP 408 and TGP 412 is combined in step 812 with the Image Modulator and Light Source Controls (MLC) to produce the controls for the image modulator 244, modulator drivers 242 and display light controls 255. The sequencing and specific controls will vary based on the configuration of these elements as well as the desired operating characteristics.

A first case is a display system consisting of an image modulator 244 which integrates a color filter and operates in a full shutter mode. In step 816, the light source is turned off to start the blanking interval. Once off, in step 814, the desired multicolor frame is scanned into image modulator 244. Once fully scanned in the image modulator is ready for display in step 818. The various light sources are illuminated in step 820 so that the image modulator 244 can either be back lit or projected or otherwise displayed as the case may be in step 824. Since the image modulator 244 includes three sub pixels via a color filter for each pixel, the light source can be white. However, to perform additional optimizations and compensations for color calibration, color temperature, ambient color and ambient temperature, the light source may be wavelength adjustable. For an LED based light system, this may involve the use of multi-colored LEDs either in place of or in addition to white LEDs. The brightness and color for each LED or for groups of LEDs may be adjusted based on their proximity to further enhance the color gamut and dynamic range of the display A second case is the display system of the first case with the additional optimization that the LEDs are managed in bands as to create a rolling shutter. As with FIG. 6, the LEDs may be arranged in strips where the MLC 420 can separately control the various strips of LEDs. To implement a rolling shutter, the timing of the LED bands is controlled relative to the timing to perform the image modulator scanning. In step 814, the image modulator 244 scanning has started. Then in step 816 a blanking interval is applied to the band of one of the LEDs that corresponds to the first band of the image modulator being scanned, while the other bands of LEDs remain on at their desired brightness levels. As the image modulator scanning progresses to band two, the LEDs associated with band two are turned off and the LEDs for band one are turned on to their desired level. This continues through all four bands and then repeats with the next image frame of data.

A third case is the display system of the first case where instead of utilizing color filters on an image modulator 244, the multi colored LEDs are sequentially displayed as color fields to produce a full color and full resolution output. As in FIG. 6, there are red, green and blue LEDs which when combined can produce all of the display colors. As such, the image modulator 244 does not need to have a color filter and the LEDs are then used for the wavelengths of color. Steps 814 and 818 are sequentially repeated for the color fields that make up the red, green and blue components of the display. Steps 816 and 820 are coordinated with steps 814 and 818 such that the appropriate LED color is switched on at the right intensity at each position after the appropriate color field image is scanned into the display. All of the sequential colors must be completed within a frame time.

A fourth case combines the rolling shutter of the second case display system with the field sequential color display system of the third case. Since the multi-colored LEDs need to be sequentially cycled within a frame time, the increase in duty cycle resulting from a rolling shutter is highly desirable. Within each color field, the bands are "rolled" with the modulator scanning where the band of the LEDs are not lit up to the desired intensity until the modulator scanning for that band has completed. Between color transitions, the shutter may be a full shutter or the rolling may continue between color transitions. For example, after the fourth and final band of the red color field has been illuminated, the image modulator scanning will start for the first band of the blue color field. At this point, the second, third and fourth bands of the red color field are either off as part of a full shutter, or those red bands continue to be displayed as part of a rolling shutter. Depending on the characteristics of the display device and the type of content being displayed, either a full shutter or rolling shutter is used.

Within each of the cases, there is an opportunity to match the frame time with the frame rate of the incoming video stream to produce very smooth motion displays. Additionally, for backlight systems that include color LEDs, there is an added opportunity to mix the LEDs with different color fields of display. For example, instead of sequentially cycling red, green and blue color fields with corresponding red, green and blue color LED sources, a sequence of image fields with multicolored light sources may be used. In step 810, the DOP would provide the mixed color field and multicolored light source information and in step 812 the MLC 420 would sequence the image modulator and LED light sources accordingly. In addition, the field times for the mixed color image modulator and multicolor LED light sources may also be varied. These techniques could be combined in image modulators that have or do not have color filters.

The controls for image modulator scanning in step 814 may be handled by the image modulator drivers 242. In step 820 the LED control circuits 602-608 control the changes in the LED or other light source to set the appropriate brightness for that frame. Depending on the light source elements, the brightness may be set by varying the voltage, current or Amplitude Modulation (AM) or via Pulse Width Modulation (PWM) of a control signal. In order to best control the brightness of the light source, a combination of AM and PWM may be used. For LEDs, for example, AM may be used to set the white point and PWM used for the real time control. Compensation circuits for both the image modulator 244 and display light controls 255 may be included in the system and may perform adaptive dynamic gamma compensation for any number of user-defined, environmental and other feedback indicators. PWM may be used to adjust the brightness quickly and may be performed on a field or sub-field time basis.

Sensor readings, in step 818, can be performed during the normal operating mode of the system or during a test and configuration mode. Step 820 utilizes FIG. 6 sensors 632a-f and their respective sensor circuits 638 as well as other optical sensors 730, environment sensors 732 and image sensors (cameras) to feed back information to the DOP 230 for use in display setup step 808. As noted earlier, display setup step 808 receives input on a feedback path 832 from display controls step 812 where the FIG. 4 sensor input 426 and DM 402 can correlate the output information and the recorded sensor readings to determine if any adjustments to display setup are required. Temporary adjustments can be processed dynamically by the different processing blocks whereas more permanent adjustments would typically be processed by the DM 402 and written into the non-volatile memory for the display map. Other color control circuits 728 may operate independent of DOP 230 to perform compensation.

Certain sensors, such as a temperature sensor, may more directly affect the MLC 420 output controls for the light source if the effects of temperature on light output are well known. Based on a measured temperature, the PWM may be increased for one or more of the light sources. In the multi-color light source case, if one of the light sources is already at maximum value, the other light sources may need to be lowered as to maintain the proper white balance for the overall display. This is at the expense of brightness, but is still better than having a display that has inaccurate color representation.

Step 820 can also be utilized during a test or calibration mode when the display is not actively being used. In the calibration mode, the display setup step 808 indicates to display controls step 812 what light source outputs and images to produce. A light source calibration procedure would sequence through different values for each light source or combination of light sources and utilize the appropriate sensors to record the brightness and wavelength. Response time for the light sources can similarly be measured where the sensor samples the brightness and wavelength at intervals less than a frame time. The transition times between different output values can be measured and recorded. Depending on the placement of the sensors, during calibration the image modulator may be turned off to best block the light sources and DOP 230 could step through a light source calibration procedure.

Similarly, in step 828, DOP 230 may capture the display output of step 824 using sensors such as digital cameras. Such cameras would likely have to be external to a flat panel display system but the cameras could be either external or built into a projection display system. In the modulator calibration procedure, various images are displayed on the screen while the digital camera captures a portrayal of such images. The captured images are analyzed and compared to the expected values and various adjustments to the DOP 230 can be made. For a projection system, the Geometric Transformation 404 adjustments either directly or via DM 402 may be necessary as described with reference to FIG. 4. Other non-visible output and capture techniques, such as those in the infrared spectrum could also be used by the system to calibrate either light sources or images. These calibration procedures would be used to determine light source display mapping and image mapping information and could be stored in non-volatile memory or in dynamic memory. The values could be stored in a variety of ways and could be compressed via several different prior art means to save on the amount of storage required.

The present invention has been explained above with reference to several embodiments. Other embodiments will be apparent to those skilled in the art in light of this disclosure. For example, display system 200 may be implemented with separate electronics systems for DIP 210 and DOP 230 controlling multiple optical and electronic subsystems to make up a display system. These and other variations upon the preferred embodiments are contemplated by the present invention, which is limited only by the appended claims.

I claim:

1. A method of displaying images on a flat panel display, comprising:
    positioning three or more different wavelength LED light sources at different locations relative to the image modulator pixels in said display;
    separately, by light source controls, varying brightnesses of said light sources within different regions of said display;
    scanning pixel values into individually controllable pixels in an image modulator array having a modulator resolution, during an image modulator scanning time; and
    using one or more controllers for
        receiving an input data stream containing image data,
        spatial processing image data for a display frame into three or more image color fields each corresponding to a different wavelength,
        filtering said image color fields to match said image modulator resolution, and
        filtering image data to a light source resolution, lower than said image modulator resolution, for controlling said LED light sources;
    wherein each of said image color fields has both a duration and an LED color combination which can be varied by said light source controls switching LEDs for successive color fields.

2. The method of claim 1 further comprising:
    sequencing, by said one or more controllers, said image color fields to correspond to a sequence of image modulator pixel values such that image modulator data sets can each vary with different light source color fields, and cycling LEDs of equal wavelength with a rolling shutter.

3. The method of claim 1 further comprising adaptively and dynamically compensating brightness of one or more of said light sources based on their positions relative to the display screen, and varying controls of said image modulator, in response to sensor feedback.

4. The method of claim 1 further comprising controlling brightnesses and durations of illumination of three or more different wavelength LED arrays, based on each array's position relative to said display, to vary composite colors of said light sources in response to sensor feedback.

5. The method of claim 1 further comprising synchronizing spatial processing image data into color fields with using said sequential fields to modulate pixel fields, and wherein LEDs for a given wavelength are not cycled all at once but used with a rolling shutter.

* * * * *